US009800884B2

(12) United States Patent
Guo et al.

(10) Patent No.: US 9,800,884 B2
(45) Date of Patent: Oct. 24, 2017

(54) DEVICE AND METHOD FOR SCALABLE CODING OF VIDEO INFORMATION

(71) Applicant: QUALCOMM Incorporated, San Diego, CA (US)

(72) Inventors: Liwei Guo, San Diego, CA (US); Jianle Chen, San Diego, CA (US); Xiang Li, San Diego, CA (US); Krishnakanth Rapaka, San Diego, CA (US); Wei Pu, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 239 days.

(21) Appl. No.: 14/205,006

(22) Filed: Mar. 11, 2014

(65) Prior Publication Data
US 2014/0269939 A1 Sep. 18, 2014

Related U.S. Application Data

(60) Provisional application No. 61/790,538, filed on Mar. 15, 2013.

(51) Int. Cl.
*H04N 19/597* (2014.01)
*H04N 19/117* (2014.01)
(Continued)

(52) U.S. Cl.
CPC ......... *H04N 19/439* (2014.11); *H04N 19/117* (2014.11); *H04N 19/132* (2014.11);
(Continued)

(58) Field of Classification Search
None
See application file for complete search history.

(56) References Cited

U.S. PATENT DOCUMENTS

2004/0017949 A1  1/2004  Lin et al.
2005/0259729 A1* 11/2005  Sun .................. H04N 19/36
                                           375/240.1
(Continued)

FOREIGN PATENT DOCUMENTS

CN  101796841 A  8/2010
CN  101822060 A  9/2010
(Continued)

OTHER PUBLICATIONS

Gao Y. et al., "H.264/Advanced Video Coding (AVC) Backward-Compatible Bit-Depth Scalable Coding", IEEE Transactions on Circuits and Systems for Video Technology, IEEE Service Center, Piscataway, NJ, US, vol. 19, No. 4, Apr. 1, 2009 (Apr. 1, 2009), pp. 500-510, XP011252921.
(Continued)

*Primary Examiner* — Christopher S Kelley
*Assistant Examiner* — Kaitlin A Retallick

(57) ABSTRACT

An apparatus configured to code video information comprises a memory unit and a processor in communication with the memory unit. The memory unit is configured to store video information associated with a reference layer (RL) and an enhancement layer (EL). The EL comprises an EL video unit and the RL comprises an RL video unit corresponding to the EL video unit. The processor is configured to perform upsampling and bit-depth conversion on pixel information of the RL video unit in a single combined process to determine predicted pixel information of the EL video unit, and determine the EL video unit using the predicted pixel information.

41 Claims, 11 Drawing Sheets

(51) Int. Cl.

| | |
|---|---|
| *H04N 19/136* | (2014.01) |
| *H04N 19/187* | (2014.01) |
| *H04N 19/42* | (2014.01) |
| *H04N 19/46* | (2014.01) |
| *H04N 19/132* | (2014.01) |
| *H04N 19/33* | (2014.01) |
| *H04N 19/59* | (2014.01) |
| *H04N 19/34* | (2014.01) |

(52) U.S. Cl.
CPC ........... *H04N 19/187* (2014.11); *H04N 19/33* (2014.11); *H04N 19/34* (2014.11); *H04N 19/46* (2014.11); *H04N 19/59* (2014.11)

(56) References Cited

U.S. PATENT DOCUMENTS

| | | | |
|---|---|---|---|
| 2005/0286792 A1* | 12/2005 | Tadas | G06T 5/20 382/261 |
| 2005/0286793 A1 | 12/2005 | Izumi et al. | |
| 2006/0222067 A1* | 10/2006 | Park | H04N 19/105 375/240.08 |
| 2008/0165848 A1* | 7/2008 | Ye | H04N 19/105 375/240.13 |
| 2009/0097558 A1* | 4/2009 | Ye | H04N 19/176 375/240.13 |
| 2009/0196354 A1 | 8/2009 | Park et al. | |
| 2009/0219994 A1* | 9/2009 | Tu | H04N 19/186 375/240.08 |
| 2010/0135393 A1* | 6/2010 | Ying Gao | H04N 19/00315 375/240.15 |
| 2010/0226427 A1* | 9/2010 | Jung | H04N 19/30 375/240.01 |
| 2011/0293003 A1* | 12/2011 | Luo | G06T 5/009 375/240.12 |
| 2012/0027079 A1* | 2/2012 | Ye | H04N 19/597 375/240.02 |
| 2013/0114678 A1* | 5/2013 | Baylon | H04N 19/176 375/240.02 |
| 2014/0010294 A1* | 1/2014 | Ye | H04N 19/70 375/240.12 |

FOREIGN PATENT DOCUMENTS

| | | |
|---|---|---|
| CN | 102388611 A | 3/2012 |
| WO | WO-2009000110 A1 | 12/2008 |
| WO | WO-2009003499 A1 | 1/2009 |
| WO | WO-2009054920 A2 | 4/2009 |
| WO | 2012012249 A1 | 1/2012 |

OTHER PUBLICATIONS

International Search Report and Written Opinion—PCT/US2014/024423—ISA/EPO—dated Oct. 31, 2014.
Partial International Search Report—PCT/US2014/024423—ISA/EPO—dated Jul. 15, 2014.
Wu Y. et al., "Bit-depth scalability compatible to H.264/AVC-scalable extension", Journal of Visual Communication and Image Representation, Academic Press, Inc, US, vol. 19, No. 6, Aug. 1, 2008 (Aug. 1, 2008), pp. 372-381, XP025611597.

* cited by examiner

DEVICE AND METHOD FOR SCALABLE CODING OF VIDEO INFORMATION

CROSS-REFERENCE TO RELATED APPLICATIONS

This application claims priority to U.S. Provisional No. 61/790,538, filed Mar. 15, 2013, which is hereby incorporated by reference in its entirety.

TECHNICAL FIELD

This disclosure relates to the field of video coding and compression, particularly to scalable video coding (SVC) or multiview video coding (MVC, 3DV).

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video coding techniques.

Video compression techniques perform spatial (intra-picture) prediction and/or temporal (inter-picture) prediction to reduce or remove redundancy inherent in video sequences. For block-based video coding, a video slice (e.g., a video frame, a portion of a video frame, etc.) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy encoding may be applied to achieve even more compression.

SUMMARY

Scalable video coding (SVC) refers to video coding in which a base layer (BL), sometimes referred to as a reference layer (RL), and one or more scalable enhancement layers (ELs) are used. In SVC, the base layer can carry video data with a base level of quality. The one or more enhancement layers can carry additional video data to support, for example, higher spatial, temporal, and/or signal-to-noise (SNR) levels. Enhancement layers may be defined relative to a previously encoded layer. For example, a bottom layer may serve as a BL, while a top layer may serve as an EL. Middle layers may serve as either ELs or RLs, or both. For example, a layer in the middle may be an EL for the layers below it, such as the base layer or any intervening enhancement layers, and at the same time serve as a RL for one or more enhancement layers above it. Similarly, in the Multi-view or 3D extension of the HEVC standard, there may be multiple views, and information of one view may be utilized to code (e.g., encode or decode) the information of another view (e.g., motion estimation, motion vector prediction and/or other redundancies).

In SVC, a current block in the enhancement layer may be predicted using the pixel information of the base layer. For example, in a coding mode for the enhancement layer called Intra BL mode, the texture (e.g., pixel or sample values) of a current block in the enhancement layer may be predicted using the texture of a co-located block in the base layer (the term "co-located" as used in the present disclosure may refer to a block in another layer that corresponds to the same picture as the current block, e.g., the block that is currently being predicted). Thus, instead of transmitting the texture of the current block, the video encoder can transmit only the difference (e.g., residue) between the texture of the current block and the texture of the co-located base layer block.

However, for certain scalability schemes such as spatial scalability and bit-depth scalability, the base layer pixel information may need to be modified before being used to predict the enhancement layer pixel information. For example, in spatial scalability, the base layer pixel information may need to be upsampled (e.g., according to the resolution ratio) before being used to predict the enhancement layer pixel information, and in bit-depth scalability, the base layer pixel information may need to undergo a bit-depth conversion (e.g., bit-shifted by the bit-depth difference) before being used to predict the enhancement layer pixel information. When spatial scalability and bit-depth scalability are both present, the base layer pixel information may need to be both upsampled and converted to a different bit-depth before being used to predict the enhancement layer pixel information. However, performing the upsampling and the bit-depth conversion in two separate processes may result in reduced coding efficiency and/or prediction accuracy (e.g., rounding error). Therefore, by combining the upsampling process and the bit-depth conversion process into a single-stage process, the coding efficiency may be improved and the computational complexity may be reduced.

The systems, methods and devices of this disclosure each have several innovative aspects, no single one of which is solely responsible for the desirable attributes disclosed herein.

In one embodiment, an apparatus configured to code (e.g., encode or decode) video information includes a memory unit and a processor in communication with the memory unit. The memory unit is configured to store video information associated with a reference layer (RL) and an enhancement layer (EL), the EL comprising an EL video unit and the RL comprising an RL video unit corresponding to the EL video unit. The processor is configured to perform upsampling and bit-depth conversion on pixel information of the RL video unit in a single-stage process to determine predicted pixel information of the EL video unit, and to determine the EL video unit using the predicted pixel information.

In one embodiment, a method of coding (e.g., encoding or decoding) video information comprises storing video information associated with a reference layer (RL) and an enhancement layer (EL), the EL comprising an EL video unit and the RL comprising an RL video unit corresponding to the EL video unit; performing upsampling and bit-depth conversion on pixel information of the RL video unit in a single combined process to determine predicted pixel information of the EL video unit; and determining the EL video unit using the predicted pixel information.

In one embodiment, a non-transitory computer readable medium comprises code that, when executed, causes an apparatus to perform a process. The process includes storing video information associated with a reference layer and an enhancement layer (EL), the EL comprising an EL video unit and the RL comprising an RL video unit corresponding to the EL video unit; performing upsampling and bit-depth conversion on pixel information of the RL video unit in a single combined process to determine predicted pixel information of the EL video unit; and determining the EL video unit using the predicted pixel information.

In one embodiment, a video coding device configured to code video information comprises means for storing video information associated with a reference layer (RL) and an enhancement layer (EL), the EL comprising an EL video unit and the RL comprising an RL video unit corresponding to the EL video unit; means for performing upsampling and bit-depth conversion on pixel information of the RL video unit in a single combined process to determine predicted pixel information of the EL video unit; and means for determining the EL video unit using the predicted pixel information.

DETAILED DESCRIPTION

Figure 1:
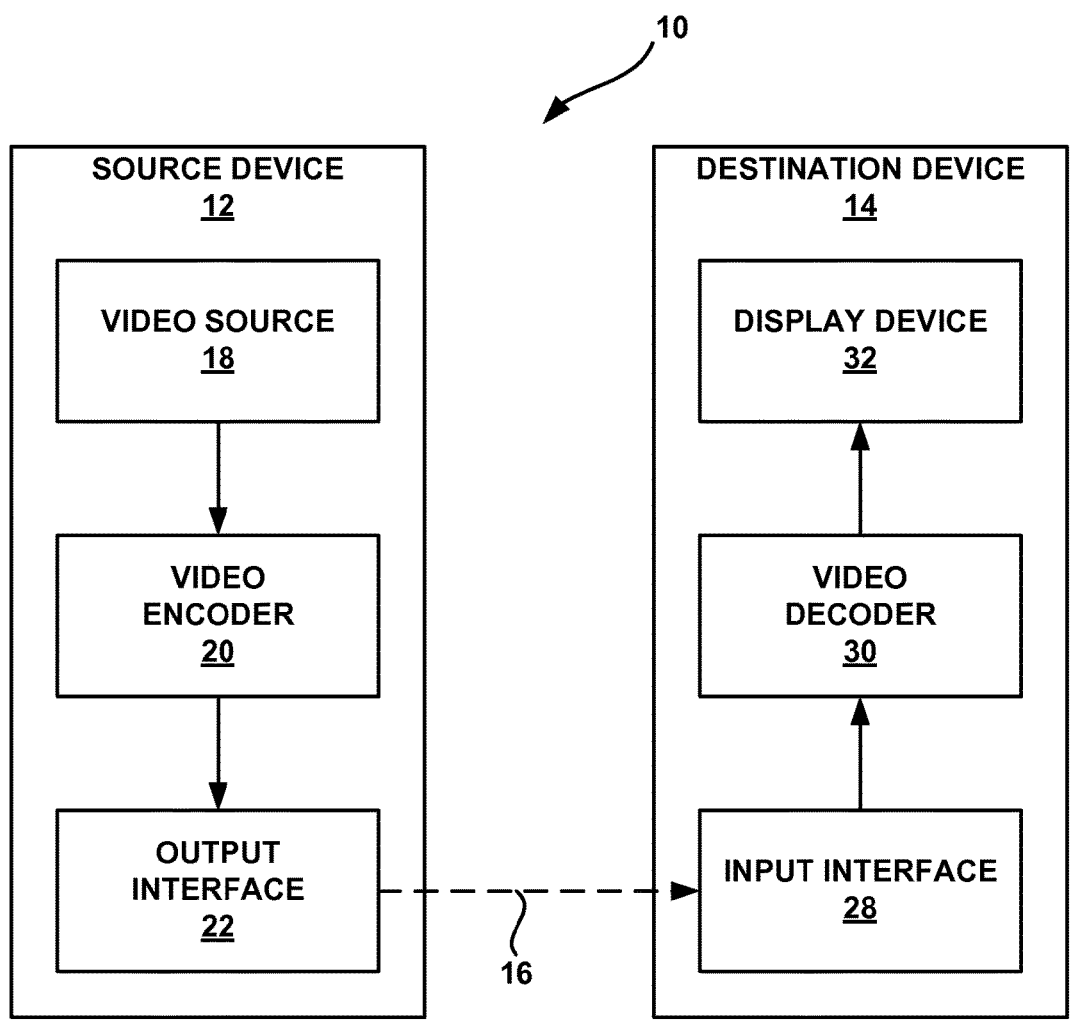
FIG. 1 is a block diagram illustrating an example of a video encoding and decoding system that may utilize techniques in accordance with aspects described in this disclosure.

Certain embodiments described herein relate to inter-layer prediction for scalable video coding in the context of advanced video codecs, such as HEVC (High Efficiency Video Coding). More specifically, the present disclosure relates to systems and methods for improved performance of inter-layer prediction in scalable video coding (SVC) extension of HEVC.

In the description below, H.264/AVC techniques related to certain embodiments are described; the HEVC standard and related techniques are also discussed. While certain embodiments are described herein in the context of the HEVC and/or H.264 standards, one having ordinary skill in the art may appreciate that systems and methods disclosed herein may be applicable to any suitable video coding standard. For example, embodiments disclosed herein may be applicable to one or more of the following standards: ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions.

HEVC generally follows the framework of previous video coding standards in many respects. The unit of prediction in HEVC is different from that in certain previous video coding standards (e.g., macroblock). In fact, the concept of macroblock does not exist in HEVC as understood in certain previous video coding standards. Macroblock is replaced by a hierarchical structure based on a quadtree scheme, which may provide high flexibility, among other possible benefits. For example, within the HEVC scheme, three types of blocks, Coding Unit (CU), Prediction Unit (PU), and Transform Unit (TU), are defined. CU may refer to the basic unit of region splitting. CU may be considered analogous to the concept of macroblock, but it does not restrict the maximum size and may allow recursive splitting into four equal size CUs to improve the content adaptivity. PU may be considered the basic unit of inter/intra prediction and it may contain multiple arbitrary shape partitions in a single PU to effectively code irregular image patterns. TU may be considered the basic unit of transform. It can be defined independently from the PU; however, its size may be limited to the CU to which the TU belongs. This separation of the block structure into three different concepts may allow each to be optimized according to its role, which may result in improved coding efficiency.

For purposes of illustration only, certain embodiments disclosed herein are described with examples including only two layers (e.g., lower level layer such as the base layer, and a higher level layer such as the enhancement layer). It should be understood that such examples may be applicable to configurations including multiple base and/or enhancement layers. In addition, for ease of explanation, the following disclosure includes the terms "frames" or "blocks" with reference to certain embodiments. However, these terms are not meant to be limiting. For example, the techniques described below can be used with any suitable video units, such as blocks (e.g., CU, PU, TU, macroblocks, etc.), slices, frames, etc.

Video Coding Standards

A digital image, such as a video image, a TV image, a still image or an image generated by a video recorder or a computer, may consist of pixels or samples arranged in horizontal and vertical lines. The number of pixels in a single image is typically in the tens of thousands. Each pixel typically contains luminance and chrominance information. Without compression, the quantity of information to be conveyed from an image encoder to an image decoder is so enormous that it renders real-time image transmission impossible. To reduce the amount of information to be transmitted, a number of different compression methods, such as JPEG, MPEG and H.263 standards, have been developed.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions.

In addition, a new video coding standard, namely High Efficiency Video Coding (HEVC), is being developed by the Joint Collaboration Team on Video Coding (JCT-VC) of ITU-T Video Coding Experts Group (VCEG) and ISO/IEC Motion Picture Experts Group (MPEG). The full citation for the HEVC Draft 10 is document JCTVC-L1003, Bross et al., "High Efficiency Video Coding (HEVC) Text Specification Draft 10," Joint Collaborative Team on Video Coding (JCT-VC) of ITU-T SG16 WP3 and ISO/IEC JTC1/SC29/WG11, 12th Meeting: Geneva, Switzerland, Jan. 14, 2013 to Jan. 23, 2013.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the present disclosure. For example, an apparatus may be implemented or a method may be practiced using any number of the aspects set forth herein. In addition, the scope of the present disclosure is intended to cover such an apparatus or method which is practiced using other structure, functionality, or structure and functionality in addition to or other than the various aspects of the present disclosure set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The attached drawings illustrate examples. Elements indicated by reference numbers in the attached drawings correspond to elements indicated by like reference numbers in the following description. In this disclosure, elements having names that start with ordinal words (e.g., "first," "second," "third," and so on) do not necessarily imply that the elements have a particular order. Rather, such ordinal words are merely used to refer to different elements of a same or similar type.

Video Coding System

FIG. 1 is a block diagram that illustrates an example video coding system 10 that may utilize techniques in accordance with aspects described in this disclosure. As used described herein, the term "video coder" refers generically to both video encoders and video decoders. In this disclosure, the terms "video coding" or "coding" may refer generically to video encoding and video decoding.

As shown in FIG. 1, video coding system 10 includes a source device 12 and a destination device 14. Source device 12 generates encoded video data. Destination device 14 may decode the encoded video data generated by source device 12. Source device 12 and destination device 14 may comprise a wide range of devices, including desktop computers, notebook (e.g., laptop, etc.) computers, tablet computers, set-top boxes, telephone handsets such as so-called "smart" phones, so-called "smart" pads, televisions, cameras, display devices, digital media players, video gaming consoles, in-car computers, or the like. In some examples, source device 12 and destination device 14 may be equipped for wireless communication.

Destination device 14 may receive encoded video data from source device 12 via a channel 16. Channel 16 may comprise any type of medium or device capable of moving the encoded video data from source device 12 to destination device 14. In one example, channel 16 may comprise a communication medium that enables source device 12 to transmit encoded video data directly to destination device 14 in real-time. In this example, source device 12 may modulate the encoded video data according to a communication standard, such as a wireless communication protocol, and may transmit the modulated video data to destination device 14. The communication medium may comprise a wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or other equipment that facilitates communication from source device 12 to destination device 14.

In another example, channel 16 may correspond to a storage medium that stores the encoded video data generated by source device 12. In this example, destination device 14 may access the storage medium via disk access or card access. The storage medium may include a variety of locally accessed data storage media such as Blu-ray discs, DVDs, CD-ROMs, flash memory, or other suitable digital storage media for storing encoded video data. In a further example, channel 16 may include a file server or another intermediate storage device that stores the encoded video generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website, etc.), FTP servers, network attached storage (NAS) devices, and local disk drives. Destination device 14 may access the encoded video data through any standard data connection, including an Internet connection. Example types of data connections may include wireless channels (e.g., Wi-Fi connections, etc.), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of any of a variety of multimedia applications, such as over-the-air television broadcasts, cable television transmissions, satellite television transmissions, streaming video transmissions, e.g., via the Internet (e.g., dynamic adaptive streaming over HTTP (DASH), etc.), encoding of digital video for storage on a data storage medium, decoding of digital video stored on a data storage medium, or other applications. In some examples, video coding system 10 may be configured to support one-way or two-way video transmission to support applications such as video streaming, video playback, video broadcasting, and/or video telephony.

In the example of FIG. 1, source device 12 includes a video source 18, video encoder 20, and an output interface 22. In some cases, output interface 22 may include a modulator/demodulator (modem) and/or a transmitter. In source device 12, video source 18 may include a source such as a video capture device, e.g., a video camera, a video archive containing previously captured video data, a video feed interface to receive video data from a video content provider, and/or a computer graphics system for generating video data, or a combination of such sources.

Video encoder 20 may be configured to encode the captured, pre-captured, or computer-generated video data. The encoded video data may be transmitted directly to destination device 14 via output interface 22 of source device 12. The encoded video data may also be stored onto a storage medium or a file server for later access by destination device 14 for decoding and/or playback.

In the example of FIG. 1, destination device 14 includes an input interface 28, a video decoder 30, and a display device 32. In some cases, input interface 28 may include a receiver and/or a modem. Input interface 28 of destination device 14 receives encoded video data over channel 16. The encoded video data may include a variety of syntax elements generated by video encoder 20 that represent the video data. The syntax elements may describe characteristics and/or processing of blocks and other coded units, e.g., groups of pictures (GOPs). Such syntax elements may be included with the encoded video data transmitted on a communication medium, stored on a storage medium, or stored a file server.

Display device 32 may be integrated with or may be external to destination device 14. In some examples, destination device 14 may include an integrated display device and may also be configured to interface with an external display device. In other examples, destination device 14 may be a display device. In general, display device 32 displays the decoded video data to a user. Display device 32 may comprise any of a variety of display devices such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC) standard presently under development, and may conform to a HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include MPEG-2 and ITU-T H.263.

Although not shown in the example of FIG. 1, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Again, FIG. 1 is merely an example and the techniques of this disclosure may apply to video coding settings (e.g., video encoding or video decoding) that do not necessarily include any data communication between the encoding and decoding devices. In other examples, data can be retrieved from a local memory, streamed over a network, or the like. An encoding device may encode and store data to memory, and/or a decoding device may retrieve and decode data from memory. In many examples, the encoding and decoding is performed by devices that do not communicate with one another, but simply encode data to memory and/or retrieve and decode data from memory.

Video encoder 20 and video decoder 30 each may be implemented as any of a variety of suitable circuitry, such as one or more microprocessors, digital signal processors (DSPs), application specific integrated circuits (ASICs), field programmable gate arrays (FPGAs), discrete logic, hardware, or any combinations thereof. When the techniques are implemented partially in software, a device may store instructions for the software in a suitable, non-transitory computer-readable storage medium and may execute the instructions in hardware using one or more processors to perform the techniques of this disclosure. Although video encoder 20 and video decoder 30 are shown as being implemented in separate devices in the example of FIG. 1, the present disclosure is not limited to such configuration, and video encoder 20 and video decoder 30 may be implemented in the same device. Each of video encoder 20 and video decoder 30 may be included in one or more encoders or decoders, either of which may be integrated as part of a combined encoder/decoder (CODEC) in a respective device. A device including video encoder 20 and/or video decoder 30 may comprise an integrated circuit, a microprocessor, and/or a wireless communication device, such as a cellular telephone.

As mentioned briefly above, video encoder 20 encodes video data. The video data may comprise one or more pictures. Each of the pictures is a still image forming part of a video. In some instances, a picture may be referred to as a video "frame." When video encoder 20 encodes the video data, video encoder 20 may generate a bitstream. The bitstream may include a sequence of bits that form a coded representation of the video data. The bitstream may include coded pictures and associated data. A coded picture is a coded representation of a picture.

To generate the bitstream, video encoder 20 may perform encoding operations on each picture in the video data. When video encoder 20 performs encoding operations on the pictures, video encoder 20 may generate a series of coded pictures and associated data. The associated data may include video parameter sets (VPS), sequence parameter sets, picture parameter sets, adaptation parameter sets, and other syntax structures. A sequence parameter set (SPS) may contain parameters applicable to zero or more sequences of pictures. A picture parameter set (PPS) may contain parameters applicable to zero or more pictures. An adaptation parameter set (APS) may contain parameters applicable to zero or more pictures. Parameters in an APS may be parameters that are more likely to change than parameters in a PPS.

To generate a coded picture, video encoder 20 may partition a picture into equally-sized video blocks. A video block may be a two-dimensional array of samples. Each of the video blocks is associated with a treeblock. In some instances, a treeblock may be referred to as a largest coding unit (LCU). The treeblocks of HEVC may be broadly analogous to the macroblocks of previous standards, such as H.264/AVC. However, a treeblock is not necessarily limited to a particular size and may include one or more coding units (CUs). Video encoder 20 may use quadtree partitioning to partition the video blocks of treeblocks into video blocks associated with CUs, hence the name "treeblocks."

In some examples, video encoder 20 may partition a picture into a plurality of slices. Each of the slices may include an integer number of CUs. In some instances, a slice comprises an integer number of treeblocks. In other instances, a boundary of a slice may be within a treeblock.

As part of performing an encoding operation on a picture, video encoder 20 may perform encoding operations on each slice of the picture. When video encoder 20 performs an encoding operation on a slice, video encoder 20 may generate encoded data associated with the slice. The encoded data associated with the slice may be referred to as a "coded slice."

To generate a coded slice, video encoder 20 may perform encoding operations on each treeblock in a slice. When video encoder 20 performs an encoding operation on a treeblock, video encoder 20 may generate a coded treeblock. The coded treeblock may comprise data representing an encoded version of the treeblock.

When video encoder 20 generates a coded slice, video encoder 20 may perform encoding operations on (e.g., encode) the treeblocks in the slice according to a raster scan order. For example, video encoder 20 may encode the treeblocks of the slice in an order that proceeds from left to right across a topmost row of treeblocks in the slice, then from left to right across a next lower row of treeblocks, and so on until video encoder 20 has encoded each of the treeblocks in the slice.

As a result of encoding the treeblocks according to the raster scan order, the treeblocks above and to the left of a given treeblock may have been encoded, but treeblocks below and to the right of the given treeblock have not yet been encoded. Consequently, video encoder 20 may be able to access information generated by encoding treeblocks above and to the left of the given treeblock when encoding the given treeblock. However, video encoder 20 may be unable to access information generated by encoding treeblocks below and to the right of the given treeblock when encoding the given treeblock.

To generate a coded treeblock, video encoder 20 may recursively perform quadtree partitioning on the video block of the treeblock to divide the video block into progressively smaller video blocks. Each of the smaller video blocks may be associated with a different CU. For example, video encoder 20 may partition the video block of a treeblock into four equally-sized sub-blocks, partition one or more of the sub-blocks into four equally-sized sub-sub-blocks, and so on. A partitioned CU may be a CU whose video block is partitioned into video blocks associated with other CUs. A non-partitioned CU may be a CU whose video block is not partitioned into video blocks associated with other CUs.

One or more syntax elements in the bitstream may indicate a maximum number of times video encoder 20 may partition the video block of a treeblock. A video block of a CU may be square in shape. The size of the video block of a CU (e.g., the size of the CU) may range from 8×8 pixels up to the size of a video block of a treeblock (e.g., the size of the treeblock) with a maximum of 64×64 pixels or greater.

Video encoder 20 may perform encoding operations on (e.g., encode) each CU of a treeblock according to a z-scan order. In other words, video encoder 20 may encode a top-left CU, a top-right CU, a bottom-left CU, and then a bottom-right CU, in that order. When video encoder 20 performs an encoding operation on a partitioned CU, video encoder 20 may encode CUs associated with sub-blocks of the video block of the partitioned CU according to the z-scan order. In other words, video encoder 20 may encode a CU associated with a top-left sub-block, a CU associated with a top-right sub-block, a CU associated with a bottom-left sub-block, and then a CU associated with a bottom-right sub-block, in that order.

As a result of encoding the CUs of a treeblock according to a z-scan order, the CUs above, above-and-to-the-left, above-and-to-the-right, left, and below-and-to-the left of a given CU may have been encoded. CUs below and to the right of the given CU have not yet been encoded. Consequently, video encoder 20 may be able to access information generated by encoding some CUs that neighbor the given CU when encoding the given CU. However, video encoder 20 may be unable to access information generated by encoding other CUs that neighbor the given CU when encoding the given CU.

When video encoder 20 encodes a non-partitioned CU, video encoder 20 may generate one or more prediction units (PUs) for the CU. Each of the PUs of the CU may be associated with a different video block within the video block of the CU. Video encoder 20 may generate a predicted video block for each PU of the CU. The predicted video block of a PU may be a block of samples. Video encoder 20 may use intra prediction or inter prediction to generate the predicted video block for a PU.

When video encoder 20 uses intra prediction to generate the predicted video block of a PU, video encoder 20 may generate the predicted video block of the PU based on decoded samples of the picture associated with the PU. If video encoder 20 uses intra prediction to generate predicted video blocks of the PUs of a CU, the CU is an intra-predicted CU. When video encoder 20 uses inter prediction to generate the predicted video block of the PU, video encoder 20 may generate the predicted video block of the PU based on decoded samples of one or more pictures other than the picture associated with the PU. If video encoder 20 uses inter prediction to generate predicted video blocks of the PUs of a CU, the CU is an inter-predicted CU.

Furthermore, when video encoder 20 uses inter prediction to generate a predicted video block for a PU, video encoder 20 may generate motion information for the PU. The motion information for a PU may indicate one or more reference blocks of the PU. Each reference block of the PU may be a video block within a reference picture. The reference picture may be a picture other than the picture associated with the PU. In some instances, a reference block of a PU may also be referred to as the "reference sample" of the PU. Video encoder 20 may generate the predicted video block for the PU based on the reference blocks of the PU.

After video encoder 20 generates predicted video blocks for one or more PUs of a CU, video encoder 20 may generate residual data for the CU based on the predicted video blocks for the PUs of the CU. The residual data for the CU may indicate differences between samples in the predicted video blocks for the PUs of the CU and the original video block of the CU.

Furthermore, as part of performing an encoding operation on a non-partitioned CU, video encoder 20 may perform recursive quadtree partitioning on the residual data of the CU to partition the residual data of the CU into one or more blocks of residual data (e.g., residual video blocks) associated with transform units (TUs) of the CU. Each TU of a CU may be associated with a different residual video block.

Video coder 20 may apply one or more transforms to residual video blocks associated with the TUs to generate transform coefficient blocks (e.g., blocks of transform coefficients) associated with the TUs. Conceptually, a transform coefficient block may be a two-dimensional (2D) matrix of transform coefficients.

After generating a transform coefficient block, video encoder 20 may perform a quantization process on the transform coefficient block. Quantization generally refers to a process in which transform coefficients are quantized to possibly reduce the amount of data used to represent the transform coefficients, providing further compression. The quantization process may reduce the bit depth associated with some or all of the transform coefficients. For example, an n-bit transform coefficient may be rounded down to an m-bit transform coefficient during quantization, where n is greater than m.

Video encoder 20 may associate each CU with a quantization parameter (QP) value. The QP value associated with a CU may determine how video encoder 20 quantizes transform coefficient blocks associated with the CU. Video encoder 20 may adjust the degree of quantization applied to the transform coefficient blocks associated with a CU by adjusting the QP value associated with the CU.

After video encoder 20 quantizes a transform coefficient block, video encoder 20 may generate sets of syntax elements that represent the transform coefficients in the quantized transform coefficient block. Video encoder 20 may apply entropy encoding operations, such as Context Adaptive Binary Arithmetic Coding (CABAC) operations, to some of these syntax elements. Other entropy coding techniques such as content adaptive variable length coding (CAVLC), probability interval partitioning entropy (PIPE) coding, or other binary arithmetic coding could also be used.

The bitstream generated by video encoder 20 may include a series of Network Abstraction Layer (NAL) units. Each of the NAL units may be a syntax structure containing an indication of a type of data in the NAL unit and bytes containing the data. For example, a NAL unit may contain data representing a video parameter set, a sequence parameter set, a picture parameter set, a coded slice, supplemental enhancement information (SEI), an access unit delimiter, filler data, or another type of data. The data in a NAL unit may include various syntax structures.

Video decoder 30 may receive the bitstream generated by video encoder 20. The bitstream may include a coded representation of the video data encoded by video encoder 20. When video decoder 30 receives the bitstream, video decoder 30 may perform a parsing operation on the bitstream. When video decoder 30 performs the parsing operation, video decoder 30 may extract syntax elements from the bitstream. Video decoder 30 may reconstruct the pictures of the video data based on the syntax elements extracted from the bitstream. The process to reconstruct the video data based on the syntax elements may be generally reciprocal to the process performed by video encoder 20 to generate the syntax elements.

After video decoder 30 extracts the syntax elements associated with a CU, video decoder 30 may generate predicted video blocks for the PUs of the CU based on the syntax elements. In addition, video decoder 30 may inverse quantize transform coefficient blocks associated with TUs of the CU. Video decoder 30 may perform inverse transforms on the transform coefficient blocks to reconstruct residual video blocks associated with the TUs of the CU. After generating the predicted video blocks and reconstructing the residual video blocks, video decoder 30 may reconstruct the video block of the CU based on the predicted video blocks and the residual video blocks. In this way, video decoder 30 may reconstruct the video blocks of CUs based on the syntax elements in the bitstream.

Video Encoder

Figure 2A:
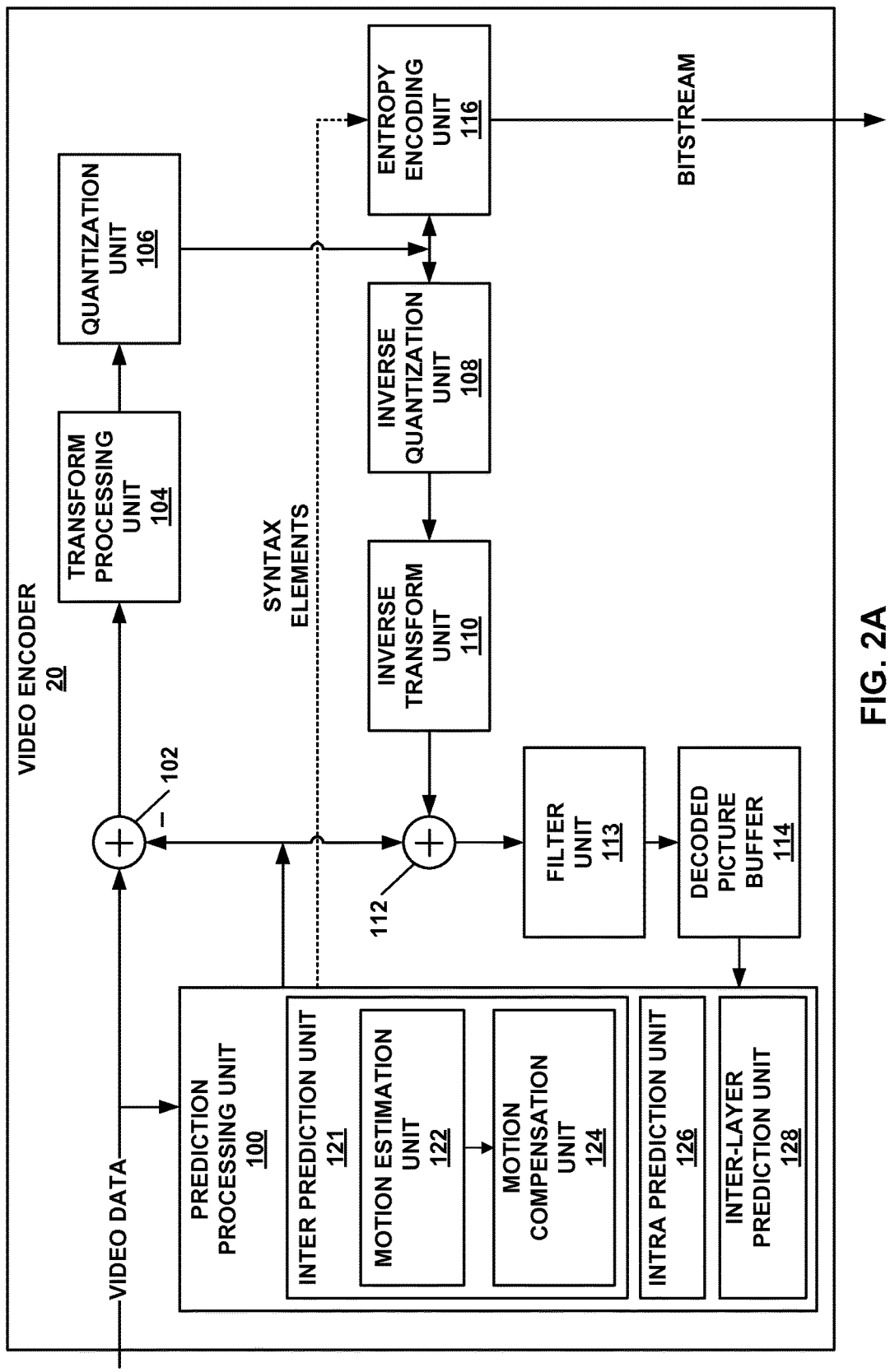
FIG. 2A is a block diagram illustrating an example of a video encoder that may implement techniques in accordance with aspects described in this disclosure.

FIG. 2A is a block diagram illustrating an example of a video encoder that may implement techniques in accordance with aspects described in this disclosure. Video encoder 20 may be configured to process a single layer of a video frame, such as for HEVC. Further, video encoder 20 may be configured to perform any or all of the techniques of this disclosure. As one example, prediction processing unit 100 may be configured to perform any or all of the techniques described in this disclosure. In another embodiment, the video encoder 20 includes an optional inter-layer prediction unit 128 that is configured to perform any or all of the techniques described in this disclosure. In other embodiments, inter-layer prediction can be performed by prediction processing unit 100 (e.g., inter prediction unit 121 and/or intra prediction unit 126), in which case the inter-layer prediction unit 128 may be omitted. However, aspects of this disclosure are not so limited. In some examples, the techniques described in this disclosure may be shared among the various components of video encoder 20. In some examples, additionally or alternatively, a processor (not shown) may be configured to perform any or all of the techniques described in this disclosure.

For purposes of explanation, this disclosure describes video encoder 20 in the context of HEVC coding. However, the techniques of this disclosure may be applicable to other coding standards or methods. The example depicted in FIG. 2A is for a single layer codec. However, as will be described further with respect to FIG. 2B, some or all of the video encoder 20 may be duplicated for processing of a multi-layer codec.

Video encoder 20 may perform intra- and inter-coding of video blocks within video slices. Intra coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-directional prediction (B mode), may refer to any of several temporal-based coding modes.

In the example of FIG. 2A, video encoder 20 includes a plurality of functional components. The functional components of video encoder 20 include a prediction processing unit 100, a residual generation unit 102, a transform processing unit 104, a quantization unit 106, an inverse quantization unit 108, an inverse transform unit 110, a reconstruction unit 112, a filter unit 113, a decoded picture buffer 114, and an entropy encoding unit 116. Prediction processing unit 100 includes an inter prediction unit 121, a motion estimation unit 122, a motion compensation unit 124, an intra prediction unit 126, and an inter-layer prediction unit 128. In other examples, video encoder 20 may include more, fewer, or different functional components. Furthermore, motion estimation unit 122 and motion compensation unit 124 may be highly integrated, but are represented in the example of FIG. 2A separately for purposes of explanation.

Video encoder 20 may receive video data. Video encoder 20 may receive the video data from various sources. For example, video encoder 20 may receive the video data from video source 18 (FIG. 1) or another source. The video data may represent a series of pictures. To encode the video data, video encoder 20 may perform an encoding operation on each of the pictures. As part of performing the encoding operation on a picture, video encoder 20 may perform encoding operations on each slice of the picture. As part of performing an encoding operation on a slice, video encoder 20 may perform encoding operations on treeblocks in the slice.

As part of performing an encoding operation on a treeblock, prediction processing unit 100 may perform quadtree partitioning on the video block of the treeblock to divide the video block into progressively smaller video blocks. Each of the smaller video blocks may be associated with a different CU. For example, prediction processing unit 100 may partition a video block of a treeblock into four equally-sized sub-blocks, partition one or more of the sub-blocks into four equally-sized sub-sub-blocks, and so on.

The sizes of the video blocks associated with CUs may range from 8×8 samples up to the size of the treeblock with a maximum of 64×64 samples or greater. In this disclosure, "N×N" and "N by N" may be used interchangeably to refer to the sample dimensions of a video block in terms of vertical and horizontal dimensions, e.g., 16×16 samples or 16 by 16 samples. In general, a 16×16 video block has sixteen samples in a vertical direction (y=16) and sixteen samples in a horizontal direction (x=16). Likewise, an N×N block generally has N samples in a vertical direction and N samples in a horizontal direction, where N represents a nonnegative integer value.

Furthermore, as part of performing the encoding operation on a treeblock, prediction processing unit 100 may generate a hierarchical quadtree data structure for the treeblock. For example, a treeblock may correspond to a root node of the quadtree data structure. If prediction processing unit 100 partitions the video block of the treeblock into four sub-blocks, the root node has four child nodes in the quadtree data structure. Each of the child nodes corresponds to a CU associated with one of the sub-blocks. If prediction processing unit 100 partitions one of the sub-blocks into four sub-sub-blocks, the node corresponding to the CU associated with the sub-block may have four child nodes, each of which corresponds to a CU associated with one of the sub-sub-blocks.

Each node of the quadtree data structure may contain syntax data (e.g., syntax elements) for the corresponding treeblock or CU. For example, a node in the quadtree may include a split flag that indicates whether the video block of the CU corresponding to the node is partitioned (e.g., split) into four sub-blocks. Syntax elements for a CU may be defined recursively, and may depend on whether the video block of the CU is split into sub-blocks. A CU whose video block is not partitioned may correspond to a leaf node in the quadtree data structure. A coded treeblock may include data based on the quadtree data structure for a corresponding treeblock.

Video encoder 20 may perform encoding operations on each non-partitioned CU of a treeblock. When video encoder 20 performs an encoding operation on a non-partitioned CU, video encoder 20 generates data representing an encoded representation of the non-partitioned CU.

As part of performing an encoding operation on a CU, prediction processing unit 100 may partition the video block of the CU among one or more PUs of the CU. Video encoder 20 and video decoder 30 may support various PU sizes. Assuming that the size of a particular CU is 2N×2N, video encoder 20 and video decoder 30 may support PU sizes of 2N×2N or N×N, and inter-prediction in symmetric PU sizes of 2N×2N, 2N×N, N×2N, N×N, 2N×nU, nL×2N, nR×2N, or similar. Video encoder 20 and video decoder 30 may also support asymmetric partitioning for PU sizes of 2N×nU, 2N×nD, nL×2N, and nR×2N. In some examples, prediction processing unit 100 may perform geometric partitioning to partition the video block of a CU among PUs of the CU along a boundary that does not meet the sides of the video block of the CU at right angles.

Inter prediction unit 121 may perform inter prediction on each PU of the CU. Inter prediction may provide temporal compression. To perform inter prediction on a PU, motion estimation unit 122 may generate motion information for the PU. Motion compensation unit 124 may generate a predicted video block for the PU based the motion information and decoded samples of pictures other than the picture associated with the CU (e.g., reference pictures). In this disclosure, a predicted video block generated by motion compensation unit 124 may be referred to as an inter-predicted video block.

Slices may be I slices, P slices, or B slices. Motion estimation unit 122 and motion compensation unit 124 may perform different operations for a PU of a CU depending on whether the PU is in an I slice, a P slice, or a B slice. In an I slice, all PUs are intra predicted. Hence, if the PU is in an I slice, motion estimation unit 122 and motion compensation unit 124 do not perform inter prediction on the PU.

If the PU is in a P slice, the picture containing the PU is associated with a list of reference pictures referred to as "list 0." Each of the reference pictures in list 0 contains samples that may be used for inter prediction of other pictures. When motion estimation unit 122 performs the motion estimation operation with regard to a PU in a P slice, motion estimation unit 122 may search the reference pictures in list 0 for a reference block for the PU. The reference block of the PU may be a set of samples, e.g., a block of samples, that most closely corresponds to the samples in the video block of the PU. Motion estimation unit 122 may use a variety of metrics to determine how closely a set of samples in a reference picture corresponds to the samples in the video block of a PU. For example, motion estimation unit 122 may determine how closely a set of samples in a reference picture corresponds to the samples in the video block of a PU by sum of absolute difference (SAD), sum of square difference (SSD), or other difference metrics.

After identifying a reference block of a PU in a P slice, motion estimation unit 122 may generate a reference index that indicates the reference picture in list 0 containing the reference block and a motion vector that indicates a spatial displacement between the PU and the reference block. In various examples, motion estimation unit 122 may generate motion vectors to varying degrees of precision. For example, motion estimation unit 122 may generate motion vectors at one-quarter sample precision, one-eighth sample precision, or other fractional sample precision. In the case of fractional sample precision, reference block values may be interpolated from integer-position sample values in the reference picture. Motion estimation unit 122 may output the reference index and the motion vector as the motion information of the PU. Motion compensation unit 124 may generate a predicted video block of the PU based on the reference block identified by the motion information of the PU.

If the PU is in a B slice, the picture containing the PU may be associated with two lists of reference pictures, referred to as "list 0" and "list 1." In some examples, a picture containing a B slice may be associated with a list combination that is a combination of list 0 and list 1.

Furthermore, if the PU is in a B slice, motion estimation unit 122 may perform uni-directional prediction or bi-directional prediction for the PU. When motion estimation unit 122 performs uni-directional prediction for the PU, motion estimation unit 122 may search the reference pictures of list 0 or list 1 for a reference block for the PU. Motion estimation unit 122 may then generate a reference index that indicates the reference picture in list 0 or list 1 that contains the reference block and a motion vector that indicates a spatial displacement between the PU and the reference block. Motion estimation unit 122 may output the reference index, a prediction direction indicator, and the motion vector as the motion information of the PU. The prediction direction indicator may indicate whether the reference index indicates a reference picture in list 0 or list 1. Motion compensation unit 124 may generate the predicted video block of the PU based on the reference block indicated by the motion information of the PU.

When motion estimation unit 122 performs bi-directional prediction for a PU, motion estimation unit 122 may search the reference pictures in list 0 for a reference block for the PU and may also search the reference pictures in list 1 for another reference block for the PU. Motion estimation unit 122 may then generate reference indexes that indicate the reference pictures in list 0 and list 1 containing the reference blocks and motion vectors that indicate spatial displacements between the reference blocks and the PU. Motion estimation unit 122 may output the reference indexes and the motion vectors of the PU as the motion information of the PU. Motion compensation unit 124 may generate the predicted video block of the PU based on the reference blocks indicated by the motion information of the PU.

In some instances, motion estimation unit 122 does not output a full set of motion information for a PU to entropy encoding unit 116. Rather, motion estimation unit 122 may signal the motion information of a PU with reference to the motion information of another PU. For example, motion estimation unit 122 may determine that the motion information of the PU is sufficiently similar to the motion information of a neighboring PU. In this example, motion estimation unit 122 may indicate, in a syntax structure associated with the PU, a value that indicates to video decoder 30 that the PU has the same motion information as the neighboring PU. In another example, motion estimation unit 122 may identify, in a syntax structure associated with the PU, a neighboring PU and a motion vector difference (MVD). The motion vector difference indicates a difference between the motion vector of the PU and the motion vector of the indicated neighboring PU. Video decoder 30 may use the motion vector of the indicated neighboring PU and the motion vector difference to determine the motion vector of the PU. By referring to the motion information of a first PU when signaling the motion information of a second PU, video encoder 20 may be able to signal the motion information of the second PU using fewer bits.

As further discussed below with reference to FIGS. 8 and 9, the prediction processing unit 100 may be configured to code (e.g., encode or decode) the PU (or any other enhancement layer blocks or video units) by performing the methods illustrated in FIGS. 8 and 9. For example, inter prediction unit 121 (e.g., via motion estimation unit 122 and/or motion compensation unit 124), intra prediction unit 126, or inter-layer prediction unit 128 may be configured to perform the methods illustrated in FIGS. 8 and 9, either together or separately.

As part of performing an encoding operation on a CU, intra prediction unit 126 may perform intra prediction on PUs of the CU. Intra prediction may provide spatial compression. When intra prediction unit 126 performs intra prediction on a PU, intra prediction unit 126 may generate prediction data for the PU based on decoded samples of other PUs in the same picture. The prediction data for the PU may include a predicted video block and various syntax elements. Intra prediction unit 126 may perform intra prediction on PUs in I slices, P slices, and B slices.

To perform intra prediction on a PU, intra prediction unit 126 may use multiple intra prediction modes to generate multiple sets of prediction data for the PU. When intra prediction unit 126 uses an intra prediction mode to generate a set of prediction data for the PU, intra prediction unit 126 may extend samples from video blocks of neighboring PUs across the video block of the PU in a direction and/or gradient associated with the intra prediction mode. The neighboring PUs may be above, above and to the right, above and to the left, or to the left of the PU, assuming a left-to-right, top-to-bottom encoding order for PUs, CUs, and treeblocks. Intra prediction unit 126 may use various numbers of intra prediction modes, e.g., 33 directional intra prediction modes, depending on the size of the PU.

Prediction processing unit 100 may select the prediction data for a PU from among the prediction data generated by motion compensation unit 124 for the PU or the prediction data generated by intra prediction unit 126 for the PU. In some examples, prediction processing unit 100 selects the prediction data for the PU based on rate/distortion metrics of the sets of prediction data.

If prediction processing unit 100 selects prediction data generated by intra prediction unit 126, prediction processing unit 100 may signal the intra prediction mode that was used to generate the prediction data for the PUs, e.g., the selected intra prediction mode. Prediction processing unit 100 may signal the selected intra prediction mode in various ways. For example, it is probable the selected intra prediction mode is the same as the intra prediction mode of a neighboring PU. In other words, the intra prediction mode of the neighboring PU may be the most probable mode for the current PU. Thus, prediction processing unit 100 may generate a syntax element to indicate that the selected intra prediction mode is the same as the intra prediction mode of the neighboring PU.

As discussed above, the video encoder 20 may include inter-layer prediction unit 128. Inter-layer prediction unit 128 is configured to predict a current block (e.g., a current block in the EL) using one or more different layers that are available in SVC (e.g., a base or reference layer). Such prediction may be referred to as inter-layer prediction. Inter-layer prediction unit 128 utilizes prediction methods to reduce inter-layer redundancy, thereby improving coding efficiency and reducing computational resource requirements. Some examples of inter-layer prediction include inter-layer intra prediction, inter-layer motion prediction, and inter-layer residual prediction. Inter-layer intra prediction uses the reconstruction of co-located blocks in the base layer to predict the current block in the enhancement layer. Inter-layer motion prediction uses motion information of the base layer to predict motion in the enhancement layer. Inter-layer residual prediction uses the residue of the base layer to predict the residue of the enhancement layer. Each of the inter-layer prediction schemes is discussed below in greater detail.

After prediction processing unit 100 selects the prediction data for PUs of a CU, residual generation unit 102 may generate residual data for the CU by subtracting (e.g., indicated by the minus sign) the predicted video blocks of the PUs of the CU from the video block of the CU. The residual data of a CU may include 2D residual video blocks that correspond to different sample components of the samples in the video block of the CU. For example, the residual data may include a residual video block that corresponds to differences between luminance components of samples in the predicted video blocks of the PUs of the CU and luminance components of samples in the original video block of the CU. In addition, the residual data of the CU may include residual video blocks that correspond to the differences between chrominance components of samples in the predicted video blocks of the PUs of the CU and the chrominance components of the samples in the original video block of the CU.

Prediction processing unit 100 may perform quadtree partitioning to partition the residual video blocks of a CU into sub-blocks. Each undivided residual video block may be associated with a different TU of the CU. The sizes and positions of the residual video blocks associated with TUs of a CU may or may not be based on the sizes and positions of video blocks associated with the PUs of the CU. A quadtree structure known as a "residual quad tree" (RQT) may include nodes associated with each of the residual video blocks. The TUs of a CU may correspond to leaf nodes of the RQT.

Transform processing unit 104 may generate one or more transform coefficient blocks for each TU of a CU by applying one or more transforms to a residual video block associated with the TU. Each of the transform coefficient blocks may be a 2D matrix of transform coefficients. Transform processing unit 104 may apply various transforms to the residual video block associated with a TU. For example, transform processing unit 104 may apply a discrete cosine transform (DCT), a directional transform, or a conceptually similar transform to the residual video block associated with a TU.

After transform processing unit 104 generates a transform coefficient block associated with a TU, quantization unit 106 may quantize the transform coefficients in the transform coefficient block. Quantization unit 106 may quantize a transform coefficient block associated with a TU of a CU based on a QP value associated with the CU.

Video encoder 20 may associate a QP value with a CU in various ways. For example, video encoder 20 may perform a rate-distortion analysis on a treeblock associated with the CU. In the rate-distortion analysis, video encoder 20 may generate multiple coded representations of the treeblock by performing an encoding operation multiple times on the treeblock. Video encoder 20 may associate different QP values with the CU when video encoder 20 generates different encoded representations of the treeblock. Video encoder 20 may signal that a given QP value is associated with the CU when the given QP value is associated with the CU in a coded representation of the treeblock that has a lowest bitrate and distortion metric.

Inverse quantization unit 108 and inverse transform unit 110 may apply inverse quantization and inverse transforms to the transform coefficient block, respectively, to reconstruct a residual video block from the transform coefficient block. Reconstruction unit 112 may add the reconstructed residual video block to corresponding samples from one or more predicted video blocks generated by prediction processing unit 100 to produce a reconstructed video block associated with a TU. By reconstructing video blocks for each TU of a CU in this way, video encoder 20 may reconstruct the video block of the CU.

After reconstruction unit 112 reconstructs the video block of a CU, filter unit 113 may perform a deblocking operation to reduce blocking artifacts in the video block associated with the CU. After performing the one or more deblocking operations, filter unit 113 may store the reconstructed video block of the CU in decoded picture buffer 114. Motion estimation unit 122 and motion compensation unit 124 may use a reference picture that contains the reconstructed video block to perform inter prediction on PUs of subsequent pictures. In addition, intra prediction unit 126 may use reconstructed video blocks in decoded picture buffer 114 to perform intra prediction on other PUs in the same picture as the CU.

Entropy encoding unit 116 may receive data from other functional components of video encoder 20. For example, entropy encoding unit 116 may receive transform coefficient blocks from quantization unit 106 and may receive syntax elements from prediction processing unit 100. When entropy encoding unit 116 receives the data, entropy encoding unit 116 may perform one or more entropy encoding operations to generate entropy encoded data. For example, video encoder 20 may perform a context adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, or another type of entropy encoding operation on the data. Entropy encoding unit 116 may output a bitstream that includes the entropy encoded data.

As part of performing an entropy encoding operation on data, entropy encoding unit 116 may select a context model. If entropy encoding unit 116 is performing a CABAC operation, the context model may indicate estimates of probabilities of particular bins having particular values. In the context of CABAC, the term "bin" is used to refer to a bit of a binarized version of a syntax element.

Multi-Layer Video Encoder

Figure 2B:
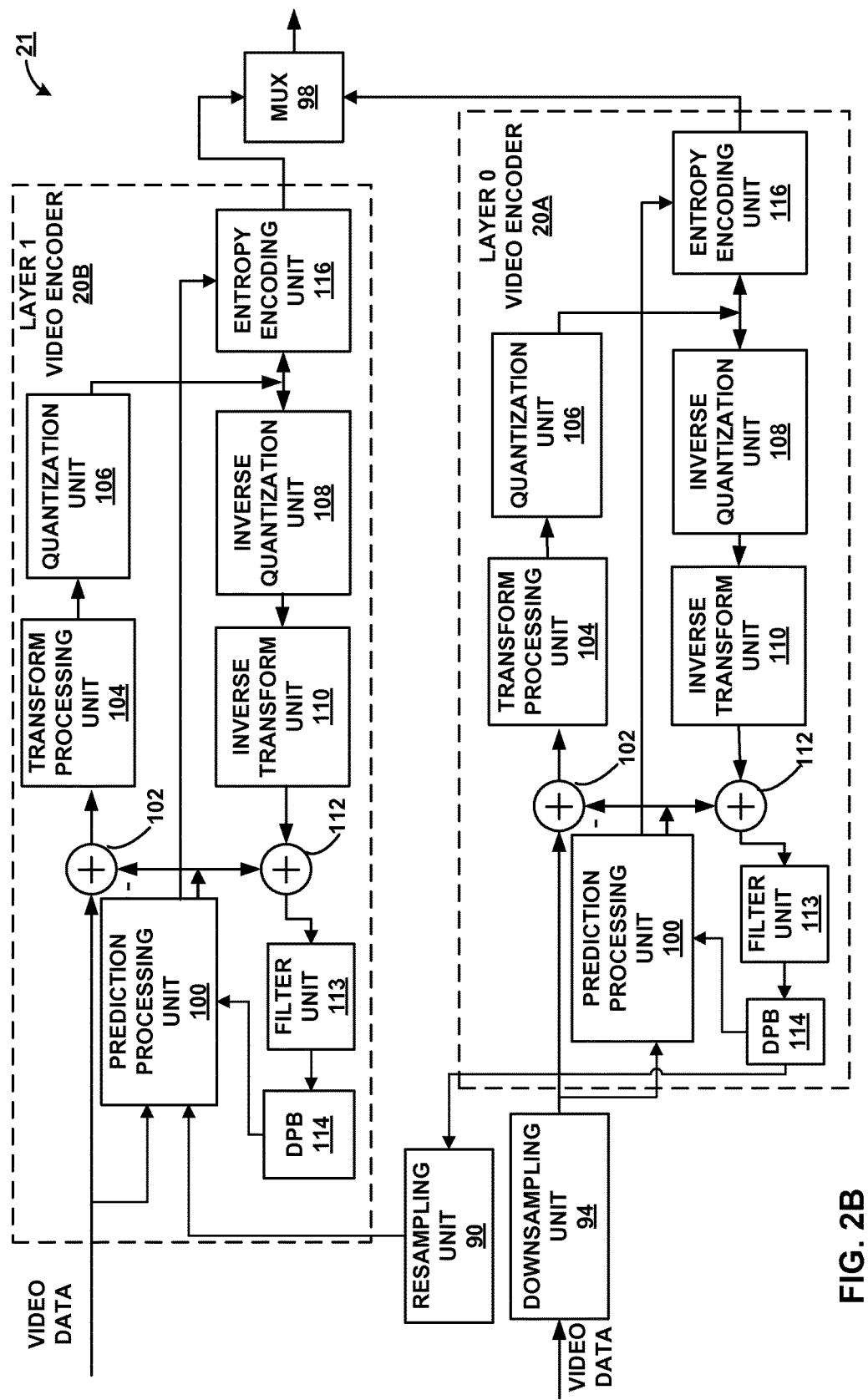
FIG. 2B is a block diagram illustrating an example of a video encoder that may implement techniques in accordance with aspects described in this disclosure.

FIG. 2B is a block diagram illustrating an example of a multi-layer video encoder 21 that may implement techniques in accordance with aspects described in this disclosure. The video encoder 21 may be configured to process multi-layer video frames, such as for SHVC and multiview coding. Further, the video encoder 21 may be configured to perform any or all of the techniques of this disclosure.

The video encoder 21 includes a video encoder 20A and video encoder 20B, each of which may be configured as the video encoder 20 and may perform the functions described above with respect to the video encoder 20. Further, as indicated by the reuse of reference numbers, the video encoders 20A and 20B may include at least some of the systems and subsystems as the video encoder 20. Although the video encoder 21 is illustrated as including two video encoders 20A and 20B, the video encoder 21 is not limited as such and may include any number of video encoder 20 layers. In some embodiments, the video encoder 21 may include a video encoder 20 for each picture or frame in an access unit. For example, an access unit that includes five pictures may be processed or encoded by a video encoder that includes five encoder layers. In some embodiments, the video encoder 21 may include more encoder layers than frames in an access unit. In some such cases, some of the video encoder layers may be inactive when processing some access units.

In addition to the video encoders 20A and 20B, the video encoder 21 may include an resampling unit 90. The resampling unit 90 may, in some cases, upsample a base layer of a received video frame to, for example, create an enhancement layer. The resampling unit 90 may upsample particular information associated with the received base layer of a frame, but not other information. For example, the resampling unit 90 may upsample the spatial size or number of pixels of the base layer, but the number of slices or the picture order count may remain constant. In some cases, the resampling unit 90 may not process the received video and/or may be optional. For example, in some cases, the prediction processing unit 100 may perform upsampling. In some embodiments, the resampling unit 90 is configured to upsample a layer and reorganize, redefine, modify, or adjust one or more slices to comply with a set of slice boundary rules and/or raster scan rules. Although primarily described as upsampling a base layer, or a lower layer in an access unit, in some cases, the resampling unit 90 may downsample a layer. For example, if during streaming of a video bandwidth is reduced, a frame may be downsampled instead of upsampled.

The resampling unit 90 may be configured to receive a picture or frame (or picture information associated with the picture) from the decoded picture buffer 114 of the lower layer encoder (e.g., the video encoder 20A) and to upsample the picture (or the received picture information). This upsampled picture may then be provided to the prediction processing unit 100 of a higher layer encoder (e.g., the video encoder 20B) configured to encode a picture in the same access unit as the lower layer encoder. In some cases, the higher layer encoder is one layer removed from the lower layer encoder. In other cases, there may be one or more higher layer encoders between the layer 0 video encoder and the layer 1 encoder of FIG. 2B.

In some cases, the resampling unit 90 may be omitted or bypassed. In such cases, the picture from the decoded picture buffer 114 of the video encoder 20A may be provided directly, or at least without being provided to the resampling unit 90, to the prediction processing unit 100 of the video encoder 20B. For example, if video data provided to the video encoder 20B and the reference picture from the decoded picture buffer 114 of the video encoder 20A are of the same size or resolution, the reference picture may be provided to the video encoder 20B without any resampling.

In some embodiments, the video encoder 21 downsamples video data to be provided to the lower layer encoder using the downsampling unit 94 before provided the video data to the video encoder 20A. Alternatively, the downsampling unit 94 may be a resampling unit 90 capable of upsampling or downsampling the video data. In yet other embodiments, the downsampling unit 94 may be omitted.

As illustrated in FIG. 2B, the video encoder 21 may further include a multiplexor 98, or mux. The mux 98 can output a combined bitstream from the video encoder 21. The combined bitstream may be created by taking a bitstream from each of the video encoders 20A and 20B and alternating which bitstream is output at a given time. While in some cases the bits from the two (or more in the case of more than two video encoder layers) bitstreams may be alternated one bit at a time, in many cases the bitstreams are combined differently. For example, the output bitstream may be created by alternating the selected bitstream one block at a time. In another example, the output bitstream may be created by outputting a non-1:1 ratio of blocks from each of the video encoders 20A and 20B. For instance, two blocks may be output from the video encoder 20B for each block output from the video encoder 20A. In some embodiments, the output stream from the mux 98 may be preprogrammed. In other embodiments, the mux 98 may combine the bitstreams from the video encoders 20A, 20B based on a control signal received from a system external to the video encoder 21, such as from a processor on the source device 12. The control signal may be generated based on the resolution or bitrate of a video from the video source 18, based on a bandwidth of the channel 16, based on a subscription associated with a user (e.g., a paid subscription versus a free subscription), or based on any other factor for determining a resolution output desired from the video encoder 21.

Video Decoder

Figure 3A:
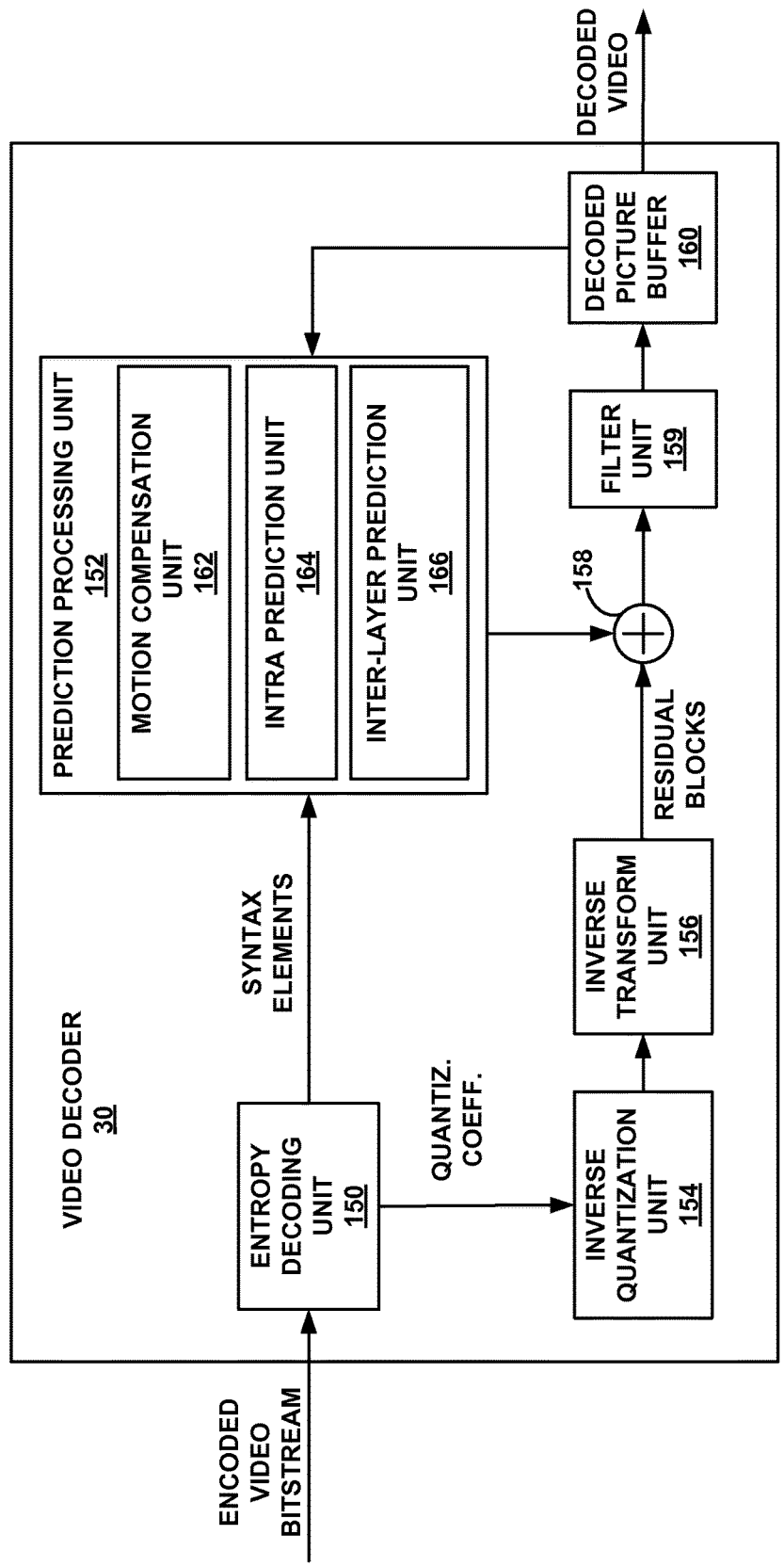
FIG. 3A is a block diagram illustrating an example of a video decoder that may implement techniques in accordance with aspects described in this disclosure.

FIG. 3A is a block diagram illustrating an example of a video decoder that may implement techniques in accordance with aspects described in this disclosure. The video decoder 30 may be configured to process a single layer of a video frame, such as for HEVC. Further, video decoder 30 may be configured to perform any or all of the techniques of this disclosure. As one example, motion compensation unit 162 and/or intra prediction unit 164 may be configured to perform any or all of the techniques described in this disclosure. In one embodiment, video decoder 30 may optionally include inter-layer prediction unit 166 that is configured to perform any or all of the techniques described in this disclosure. In other embodiments, inter-layer prediction can be performed by prediction processing unit 152 (e.g., motion compensation unit 162 and/or intra prediction unit 164), in which case the inter-layer prediction unit 166 may be omitted. However, aspects of this disclosure are not so limited. In some examples, the techniques described in this disclosure may be shared among the various components of video decoder 30. In some examples, additionally or alternatively, a processor (not shown) may be configured to perform any or all of the techniques described in this disclosure.

For purposes of explanation, this disclosure describes video decoder 30 in the context of HEVC coding. However, the techniques of this disclosure may be applicable to other coding standards or methods. The example depicted in FIG. 3A is for a single layer codec. However, as will be described further with respect to FIG. 3B, some or all of the video decoder 30 may be duplicated for processing of a multi-layer codec.

In the example of FIG. 3A, video decoder 30 includes a plurality of functional components. The functional components of video decoder 30 include an entropy decoding unit 150, a prediction processing unit 152, an inverse quantization unit 154, an inverse transform unit 156, a reconstruction unit 158, a filter unit 159, and a decoded picture buffer 160.

Prediction processing unit 152 includes a motion compensation unit 162, an intra prediction unit 164, and an inter-layer prediction unit 166. In some examples, video decoder 30 may perform a decoding pass generally reciprocal to the encoding pass described with respect to video encoder 20 of FIG. 2A. In other examples, video decoder 30 may include more, fewer, or different functional components.

Video decoder 30 may receive a bitstream that comprises encoded video data. The bitstream may include a plurality of syntax elements. When video decoder 30 receives the bitstream, entropy decoding unit 150 may perform a parsing operation on the bitstream. As a result of performing the parsing operation on the bitstream, entropy decoding unit 150 may extract syntax elements from the bitstream. As part of performing the parsing operation, entropy decoding unit 150 may entropy decode entropy encoded syntax elements in the bitstream. Prediction processing unit 152, inverse quantization unit 154, inverse transform unit 156, reconstruction unit 158, and filter unit 159 may perform a reconstruction operation that generates decoded video data based on the syntax elements extracted from the bitstream.

As discussed above, the bitstream may comprise a series of NAL units. The NAL units of the bitstream may include video parameter set NAL units, sequence parameter set NAL units, picture parameter set NAL units, SEI NAL units, and so on. As part of performing the parsing operation on the bitstream, entropy decoding unit 150 may perform parsing operations that extract and entropy decode sequence parameter sets from sequence parameter set NAL units, picture parameter sets from picture parameter set NAL units, SEI data from SEI NAL units, and so on.

In addition, the NAL units of the bitstream may include coded slice NAL units. As part of performing the parsing operation on the bitstream, entropy decoding unit 150 may perform parsing operations that extract and entropy decode coded slices from the coded slice NAL units. Each of the coded slices may include a slice header and slice data. The slice header may contain syntax elements pertaining to a slice. The syntax elements in the slice header may include a syntax element that identifies a picture parameter set associated with a picture that contains the slice. Entropy decoding unit 150 may perform entropy decoding operations, such as CABAC decoding operations, on syntax elements in the coded slice header to recover the slice header.

As part of extracting the slice data from coded slice NAL units, entropy decoding unit 150 may perform parsing operations that extract syntax elements from coded CUs in the slice data. The extracted syntax elements may include syntax elements associated with transform coefficient blocks. Entropy decoding unit 150 may then perform CABAC decoding operations on some of the syntax elements.

After entropy decoding unit 150 performs a parsing operation on a non-partitioned CU, video decoder 30 may perform a reconstruction operation on the non-partitioned CU. To perform the reconstruction operation on a non-partitioned CU, video decoder 30 may perform a reconstruction operation on each TU of the CU. By performing the reconstruction operation for each TU of the CU, video decoder 30 may reconstruct a residual video block associated with the CU.

As part of performing a reconstruction operation on a TU, inverse quantization unit 154 may inverse quantize, e.g., de-quantize, a transform coefficient block associated with the TU. Inverse quantization unit 154 may inverse quantize the transform coefficient block in a manner similar to the inverse quantization processes proposed for HEVC or defined by the H.264 decoding standard. Inverse quantization unit 154 may use a quantization parameter QP calculated by video encoder 20 for a CU of the transform coefficient block to determine a degree of quantization and, likewise, a degree of inverse quantization for inverse quantization unit 154 to apply.

After inverse quantization unit 154 inverse quantizes a transform coefficient block, inverse transform unit 156 may generate a residual video block for the TU associated with the transform coefficient block. Inverse transform unit 156 may apply an inverse transform to the transform coefficient block in order to generate the residual video block for the TU. For example, inverse transform unit 156 may apply an inverse DCT, an inverse integer transform, an inverse Karhunen-Loeve transform (KLT), an inverse rotational transform, an inverse directional transform, or another inverse transform to the transform coefficient block. In some examples, inverse transform unit 156 may determine an inverse transform to apply to the transform coefficient block based on signaling from video encoder 20. In such examples, inverse transform unit 156 may determine the inverse transform based on a signaled transform at the root node of a quadtree for a treeblock associated with the transform coefficient block. In other examples, inverse transform unit 156 may infer the inverse transform from one or more coding characteristics, such as block size, coding mode, or the like. In some examples, inverse transform unit 156 may apply a cascaded inverse transform.

In some examples, motion compensation unit 162 may refine the predicted video block of a PU by performing interpolation based on interpolation filters. Identifiers for interpolation filters to be used for motion compensation with sub-sample precision may be included in the syntax elements. Motion compensation unit 162 may use the same interpolation filters used by video encoder 20 during generation of the predicted video block of the PU to calculate interpolated values for sub-integer samples of a reference block. Motion compensation unit 162 may determine the interpolation filters used by video encoder 20 according to received syntax information and use the interpolation filters to produce the predicted video block.

As further discussed below with reference to FIGS. 8 and 9, the prediction processing unit 152 may code (e.g., encode or decode) the PU (or any other enhancement layer blocks or video units) by performing the methods illustrated in FIGS. 8 and 9. For example, motion compensation unit 162, intra prediction unit 164, or inter-layer prediction unit 166 may be configured to perform the methods illustrated in FIGS. 8 and 9, either together or separately.

If a PU is encoded using intra prediction, intra prediction unit 164 may perform intra prediction to generate a predicted video block for the PU. For example, intra prediction unit 164 may determine an intra prediction mode for the PU based on syntax elements in the bitstream. The bitstream may include syntax elements that intra prediction unit 164 may use to determine the intra prediction mode of the PU.

In some instances, the syntax elements may indicate that intra prediction unit 164 is to use the intra prediction mode of another PU to determine the intra prediction mode of the current PU. For example, it may be probable that the intra prediction mode of the current PU is the same as the intra prediction mode of a neighboring PU. In other words, the intra prediction mode of the neighboring PU may be the most probable mode for the current PU. Hence, in this example, the bitstream may include a small syntax element that indicates that the intra prediction mode of the PU is the same as the intra prediction mode of the neighboring PU.

Intra prediction unit 164 may then use the intra prediction mode to generate prediction data (e.g., predicted samples) for the PU based on the video blocks of spatially neighboring PUs.

As discussed above, video decoder 30 may also include inter-layer prediction unit 166. Inter-layer prediction unit 166 is configured to predict a current block (e.g., a current block in the EL) using one or more different layers that are available in SVC (e.g., a base or reference layer). Such prediction may be referred to as inter-layer prediction. Inter-layer prediction unit 166 utilizes prediction methods to reduce inter-layer redundancy, thereby improving coding efficiency and reducing computational resource requirements. Some examples of inter-layer prediction include inter-layer intra prediction, inter-layer motion prediction, and inter-layer residual prediction. Inter-layer intra prediction uses the reconstruction of co-located blocks in the base layer to predict the current block in the enhancement layer. Inter-layer motion prediction uses motion information of the base layer to predict motion in the enhancement layer. Inter-layer residual prediction uses the residue of the base layer to predict the residue of the enhancement layer. Each of the inter-layer prediction schemes is discussed below in greater detail.

Reconstruction unit 158 may use the residual video blocks associated with TUs of a CU and the predicted video blocks of the PUs of the CU, e.g., either intra-prediction data or inter-prediction data, as applicable, to reconstruct the video block of the CU. Thus, video decoder 30 may generate a predicted video block and a residual video block based on syntax elements in the bitstream and may generate a video block based on the predicted video block and the residual video block.

After reconstruction unit 158 reconstructs the video block of the CU, filter unit 159 may perform a deblocking operation to reduce blocking artifacts associated with the CU. After filter unit 159 performs a deblocking operation to reduce blocking artifacts associated with the CU, video decoder 30 may store the video block of the CU in decoded picture buffer 160. Decoded picture buffer 160 may provide reference pictures for subsequent motion compensation, intra prediction, and presentation on a display device, such as display device 32 of FIG. 1. For instance, video decoder 30 may perform, based on the video blocks in decoded picture buffer 160, intra prediction or inter prediction operations on PUs of other CUs.

Multi-Layer Decoder

Figure 3B:
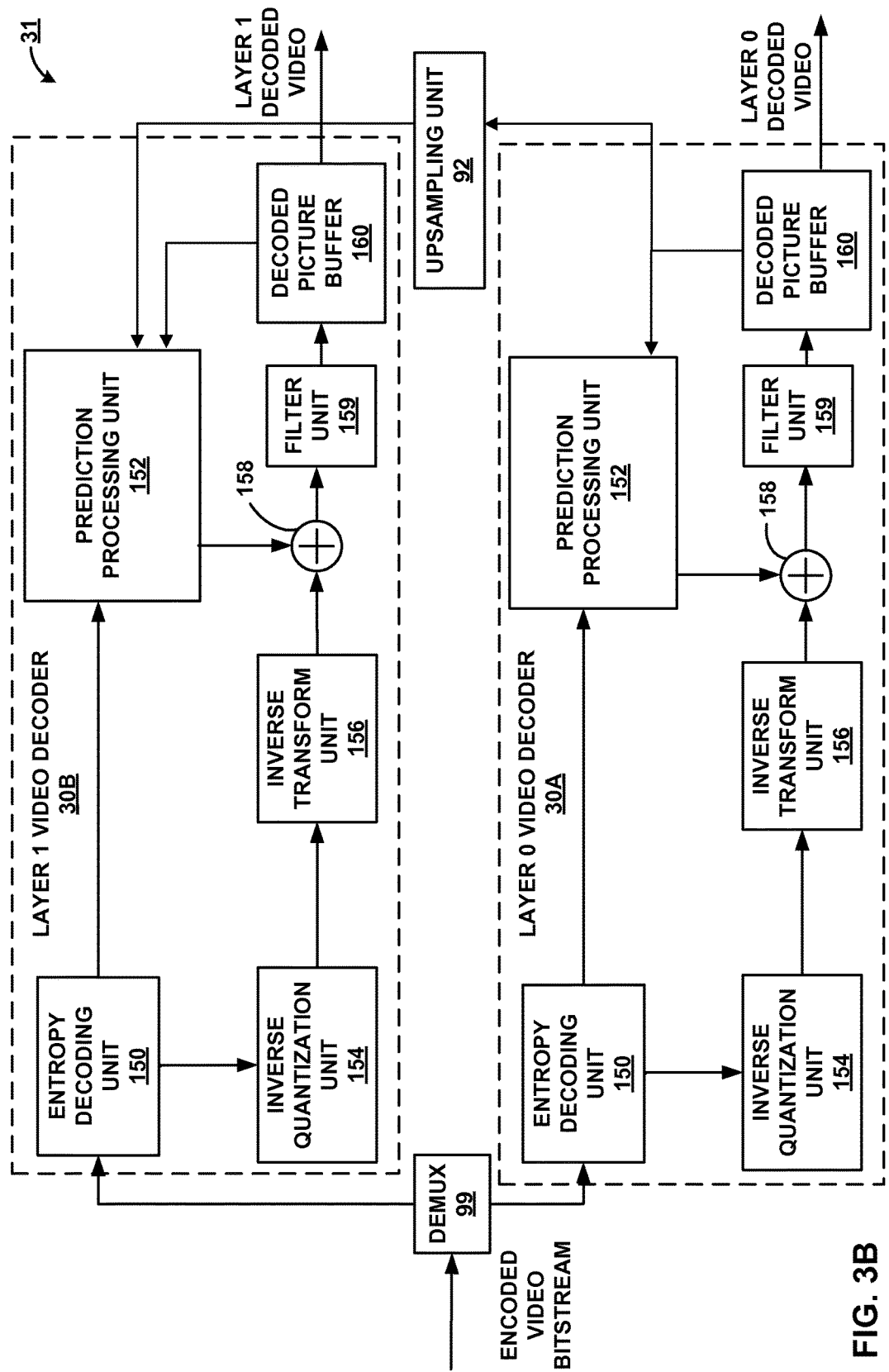
FIG. 3B is a block diagram illustrating an example of a video decoder that may implement techniques in accordance with aspects described in this disclosure.

FIG. 3B is a block diagram illustrating an example of a multi-layer video decoder 31 that may implement techniques in accordance with aspects described in this disclosure. The video decoder 31 may be configured to process multi-layer video frames, such as for SHVC and multiview coding. Further, the video decoder 31 may be configured to perform any or all of the techniques of this disclosure.

The video decoder 31 includes a video decoder 30A and video decoder 30B, each of which may be configured as the video decoder 30 and may perform the functions described above with respect to the video decoder 30. Further, as indicated by the reuse of reference numbers, the video decoders 30A and 30B may include at least some of the systems and subsystems as the video decoder 30. Although the video decoder 31 is illustrated as including two video decoders 30A and 30B, the video decoder 31 is not limited as such and may include any number of video decoder 30 layers. In some embodiments, the video decoder 31 may include a video decoder 30 for each picture or frame in an access unit. For example, an access unit that includes five pictures may be processed or decoded by a video decoder that includes five decoder layers. In some embodiments, the video decoder 31 may include more decoder layers than frames in an access unit. In some such cases, some of the video decoder layers may be inactive when processing some access units.

In addition to the video decoders 30A and 30B, the video decoder 31 may include an upsampling unit 92. In some embodiments, the upsampling unit 92 may upsample a base layer of a received video frame to create an enhanced layer to be added to the reference picture list for the frame or access unit. This enhanced layer can be stored in the decoded picture buffer 160. In some embodiments, the upsampling unit 92 can include some or all of the embodiments described with respect to the resampling unit 90 of FIG. 2A. In some embodiments, the upsampling unit 92 is configured to upsample a layer and reorganize, redefine, modify, or adjust one or more slices to comply with a set of slice boundary rules and/or raster scan rules. In some cases, the upsampling unit 92 may be a resampling unit configured to upsample and/or downsample a layer of a received video frame The upsampling unit 92 may be configured to receive a picture or frame (or picture information associated with the picture) from the decoded picture buffer 160 of the lower layer decoder (e.g., the video decoder 30A) and to upsample the picture (or the received picture information). This upsampled picture may then be provided to the prediction processing unit 152 of a higher layer decoder (e.g., the video decoder 30B) configured to decode a picture in the same access unit as the lower layer decoder. In some cases, the higher layer decoder is one layer removed from the lower layer decoder. In other cases, there may be one or more higher layer decoders between the layer 0 decoder and the layer 1 decoder of FIG. 3B.

In some cases, the upsampling unit 92 may be omitted or bypassed. In such cases, the picture from the decoded picture buffer 160 of the video decoder 30A may be provided directly, or at least without being provided to the upsampling unit 92, to the prediction processing unit 152 of the video decoder 30B. For example, if video data provided to the video decoder 30B and the reference picture from the decoded picture buffer 160 of the video decoder 30A are of the same size or resolution, the reference picture may be provided to the video decoder 30B without upsampling. Further, in some embodiments, the upsampling unit 92 may be a resampling unit 90 configured to upsample or downsample a reference picture received from the decoded picture buffer 160 of the video decoder 30A.

As illustrated in FIG. 3B, the video decoder 31 may further include a demultiplexor 99, or demux. The demux 99 can split an encoded video bitstream into multiple bitstreams with each bitstream output by the demux 99 being provided to a different video decoder 30A and 30B. The multiple bitstreams may be created by receiving a bitstream and each of the video decoders 30A and 30B receives a portion of the bitstream at a given time. While in some cases the bits from the bitstream received at the demux 99 may be alternated one bit at a time between each of the video decoders (e.g., video decoders 30A and 30B in the example of FIG. 3B), in many cases the bitstream is divided differently. For example, the bitstream may be divided by alternating which video decoder receives the bitstream one block at a time. In another example, the bitstream may be divided by a non-1:1 ratio of blocks to each of the video decoders 30A and 30B. For instance, two blocks may be provided to the video decoder 30B for each block provided to the video decoder 30A. In some embodiments, the division of the bitstream by the demux 99 may be preprogrammed. In other embodiments, the demux 99 may divide the bitstream based on a control signal received from a system external to the video decoder 31, such as from a processor on the destination device 14. The control signal may be generated based on the resolution or bitrate of a video from the input interface 28, based on a bandwidth of the channel 16, based on a subscription associated with a user (e.g., a paid subscription versus a free subscription), or based on any other factor for determining a resolution obtainable by the video decoder 31.

Structures of Scalable Video Coding (SVC)

Figure 4:
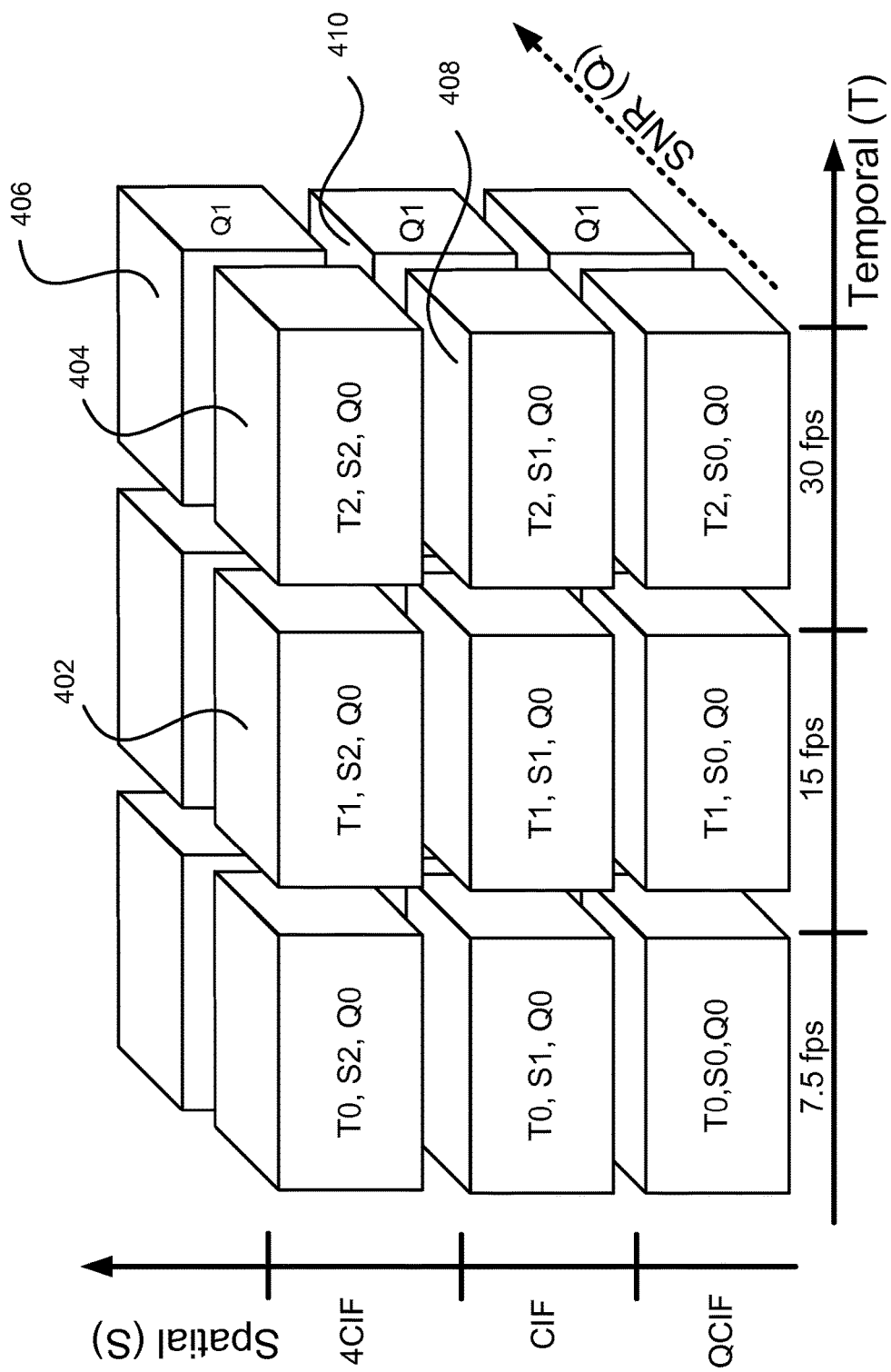
FIG. 4 is a conceptual diagram illustrating SVC scalabilities in different dimensions.

FIG. 4 is a conceptual diagram showing example scalabilities in different dimensions. As discussed above, one example implementation of SVC refers to the scalable video coding extension of HEVC. The scalable video coding extension of HEVC allows video information to be provided in layers. Each layer can provide video information corresponding to a different scalability. In HEVC, scalabilities are enabled in three dimensions: temporal (or time) scalability, spatial scalability, and quality scalability (sometimes referred to as signal-to-noise ratio or SNR scalability). For example, in the time dimension, frame rates with 7.5 Hz, 15 Hz, 30 Hz, and etc. can be supported by temporal scalability (T). When spatial scalability (S) is supported, different resolutions such as QCIF, CIF, 4CIF, and etc. may be enabled. For each specific spatial resolution and frame rate, the SNR (Q) layers can be added to improve the picture quality.

Once video content has been encoded in such a scalable way, an extractor tool may be used to adapt the actual delivered content according to application requirements, which can depend, for example, on the clients or the transmission channel. In the example shown in FIG. 4, each cubic contains the pictures with the same frame rate (temporal level), spatial resolution and SNR layers. For example, cubes 402 and 404 contain pictures having the same resolution and SNR, but different frame rates. Cubes 402 and 406 represent pictures having the same resolution (e.g., in the same spatial layer), but different SNRs and frame rates. Cubes 402 and 408 represent pictures having the same SNR (e.g., in the same quality layer), but different resolutions and frame rates. Cubes 402 and 410 represent pictures having different resolutions, frame rates, and SNRs. Better representation can be achieved by adding those cubes (pictures) in any dimension. Combined scalability is supported when there are two, three or even more scalabilities enabled. For example, by combining the pictures in cube 402 with those in cube 404, a higher frame rate may be realized. By combining the pictures in cube 404 with those in cube 406, a better SNR may be realized.

According to the SVC extension of HEVC, the pictures with the lowest spatial and quality layer are compatible with HEVC, and the pictures at the lowest temporal level form the temporal base layer, which can be enhanced with pictures at higher temporal levels. In addition to the HEVC compatible layer, several spatial and/or SNR enhancement layers can be added to provide spatial and/or quality scalabilities. SNR scalability is also referred as quality scalability. Each spatial or SNR enhancement layer itself may be temporally scalable, with the same temporal scalability structure as the HEVC compatible layer. For one spatial or SNR enhancement layer, the lower layer it depends on is also referred as the base layer of that specific spatial or SNR enhancement layer.

Figure 5:
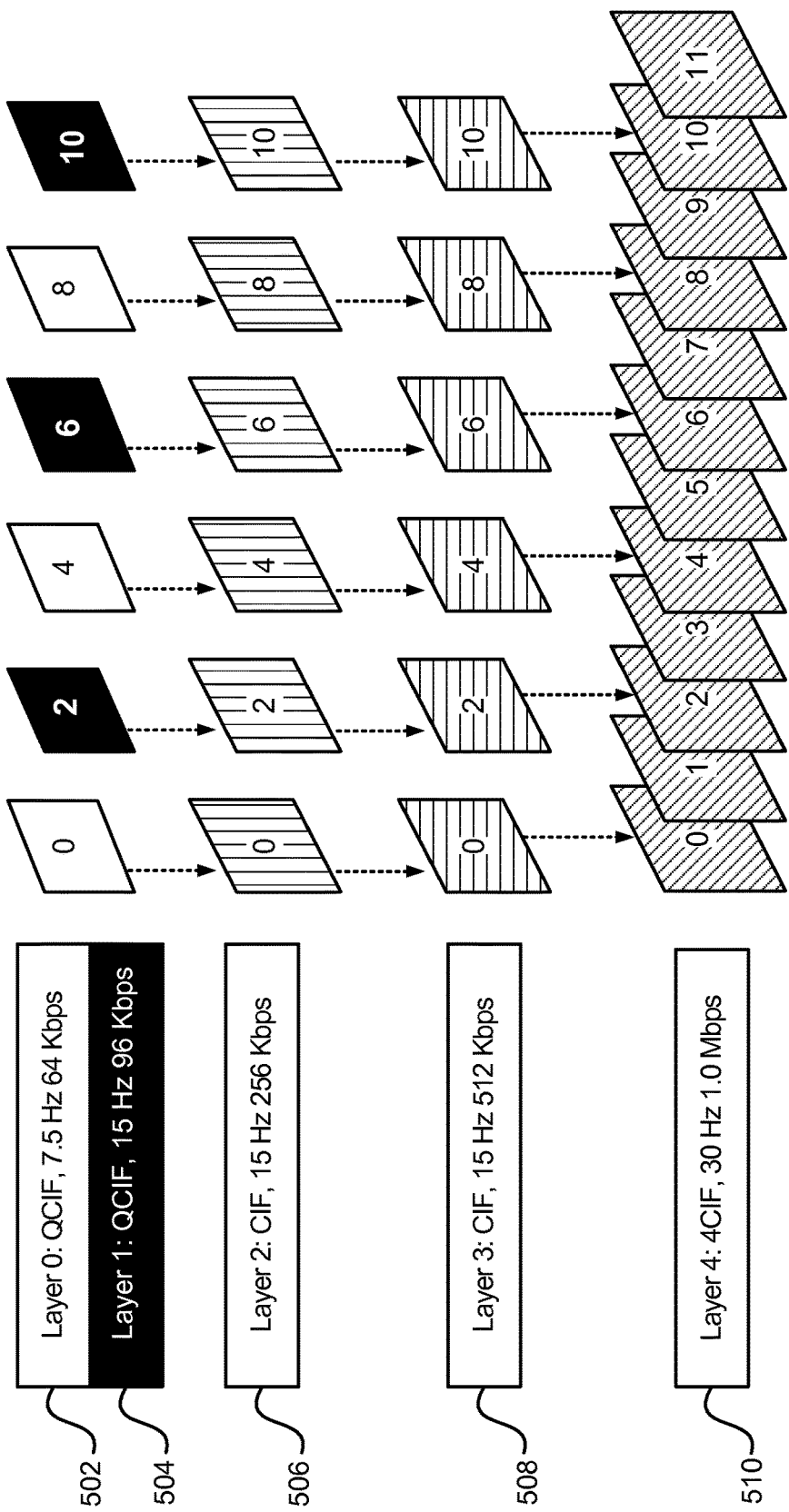
FIG. 5 is a conceptual diagram illustrating an example structure of an SVC bitstream.

FIG. 5 is a conceptual diagram showing an example scalable video coded bitstream. In the example SVC coding structure shown in FIG. 5, the pictures with the lowest spatial and quality layer (pictures in layer 502 and layer 504, which provide QCIF resolution) are compatible with HEVC. Among them, those pictures of the lowest temporal level form the temporal base layer 502, as shown in FIG. 5. This temporal base layer (e.g., layer 502) can be enhanced with pictures of higher temporal levels, such as layer 504. In addition to the HEVC compatible layer, several spatial and/or SNR enhancement layers can be added to provide spatial and/or quality scalabilities. For example, an enhancement layer may be a CIF representation having the same resolution as layer 506. In the example shown in FIG. 5, layer 508 is a SNR enhancement layer. As shown in the example, each spatial or SNR enhancement layer itself may be temporally scalable, with the same temporal scalability structure as the HEVC compatible layer. Also, an enhancement layer can enhance both spatial resolution and frame rate. For example, layer 510 provides a 4CIF enhancement layer, which further increases the frame rate from 15 Hz to 30 Hz.

Figure 6:
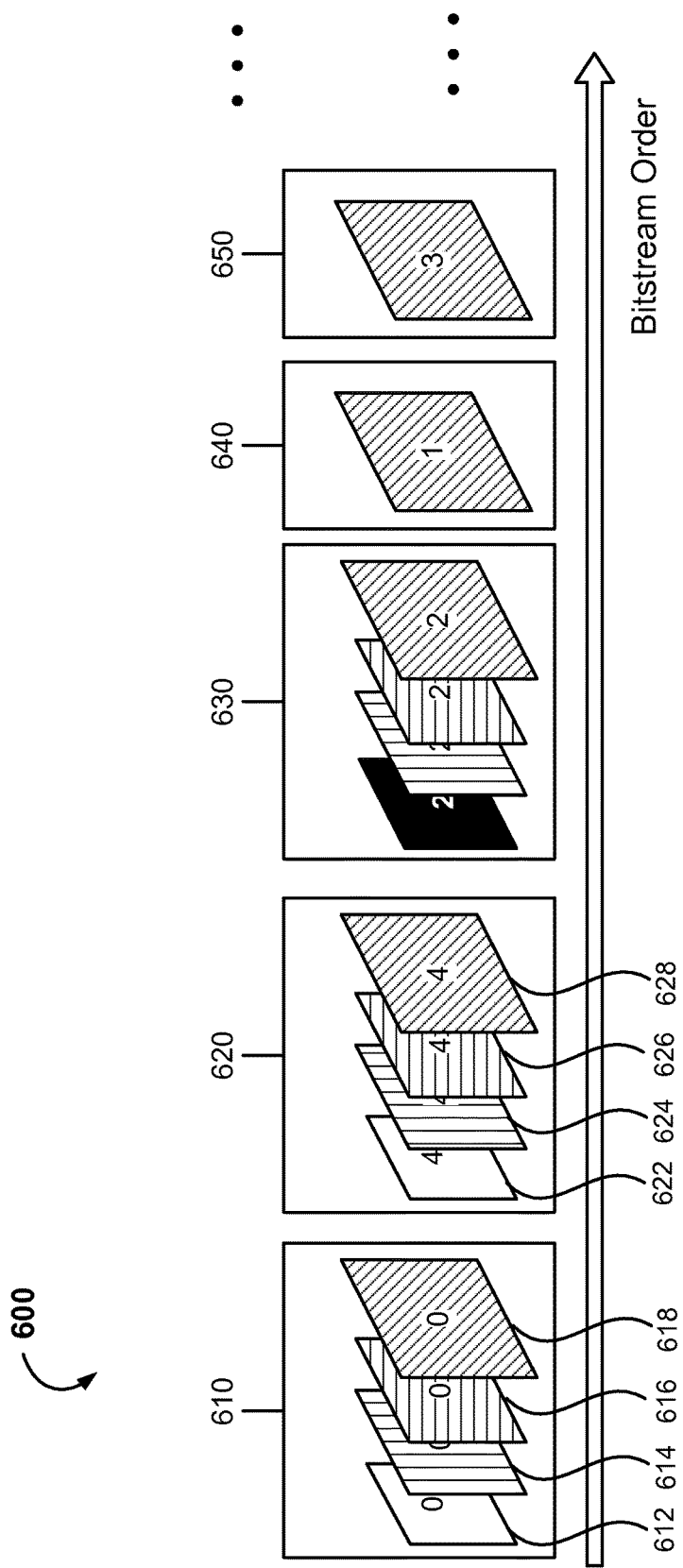
FIG. 6 is a conceptual diagram illustrating access units in an SVC bitstream.

FIG. 6 is a conceptual diagram showing example access units (e.g., coded picture made up of one or more slices) in a scalable video coded bitstream 600. As shown in FIG. 6, in some embodiments, the coded slices in the same time instance are successive in the bitstream order and form one access unit in the context of SVC. Those SVC access units then follow the decoding order, which could be different from the display order. The decoding order may be decided, for example, by the temporal prediction relationship. For example, access unit 610 consisting of all four layers 612, 614, 616, and 618 for frame 0 (e.g., for frame 0 as illustrated in FIG. 5) may be followed by access unit 620 consisting of all four layers 622, 624, 626, and 628 for frame 4 (e.g., for frame 4 in FIG. 5). Access unit 630 for frame 2 may follow out of order, at least from a video playback perspective. However, information from frames 0 and 4 may be used when encoding or decoding frame 2, and therefore frame 4 can be encoded or decoded prior to frame 2. Access units 640 and 650 for the remaining frames between frames 0 and 4 may follow, as shown in FIG. 6.

Features of Scalable Video Coding (SVC)

Inter-Layer Prediction

As discussed above, in SVC, an enhancement layer may be predicted based on the information derived from a reference layer. Such a prediction method is called inter-layer prediction. Inter-layer prediction takes advantage of the redundancies that exist between the different layers. One of the inter-layer prediction schemes is inter-layer intra prediction. The coding mode using inter-layer intra prediction may be called "Intra-BL" mode. Such a prediction mode is illustrated below with reference to FIG. 7.

Figure 7:
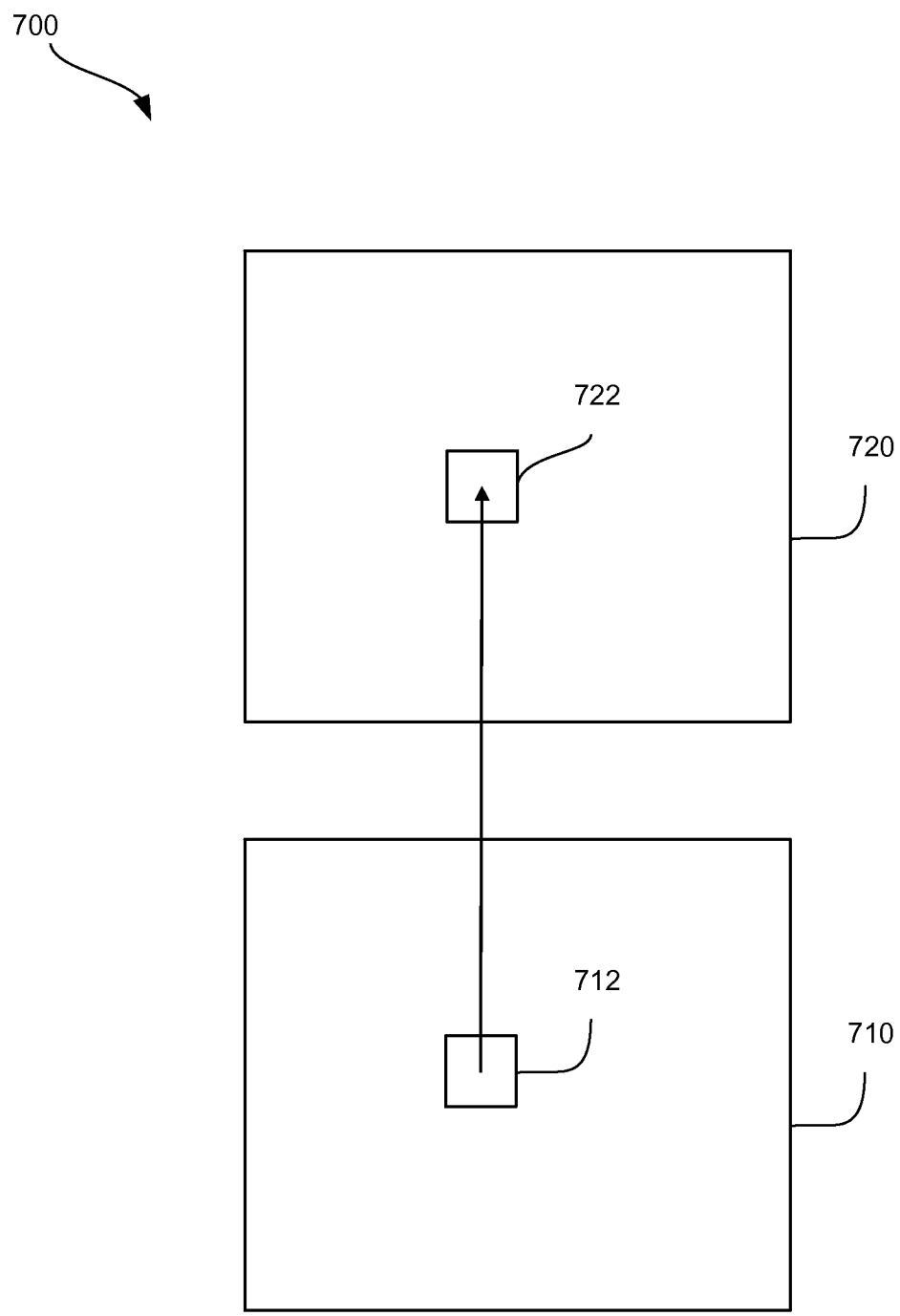
FIG. 7 is a conceptual diagram illustrating an example of inter-layer prediction, according to one embodiment of the present disclosure.

FIG. 7 illustrates a schematic of an example 700 of Intra-BL prediction. In particular, a base layer block 712 in a base layer 710 is co-located with an enhancement layer block 722 in an enhancement layer 720. In Intra-BL mode, the texture of block 722 can be predicted using the texture of the co-located base layer block 712. For example, it is possible that pixel values of the co-located base layer block 712 and the pixel values of the enhancement layer block 722 are very similar to each other, since the co-located base layer block 712 essentially depicts the same video object as the enhancement layer block 722. Thus, the pixel values of the co-located base layer block 712 may serve as a predictor for predicting the pixel values of the enhancement layer block 722. The base layer block 712 may be upsampled before being used to predict the enhancement layer block 722 if the enhancement layer 720 and the base layer 710 have different resolutions. For example, the base layer picture may be 1280×720 and the enhancement layer may be 1920×1080, in which case the base layer block or the base layer picture may be upsampled by a factor of 1.5 in each direction (e.g., horizontal and vertical) before being used to predict the enhancement layer block or picture. The prediction error (e.g., residue) may be transformed, quantized and entropy encoded. The term "co-located" may be used herein to describe the position of the base layer block that depicts the same video object as the enhancement layer block. Alternatively, the term may mean that the co-located base layer block may have the same coordinate values (after the resolution ratio between the base layer and the enhancement layer is taken into account) as the enhancement layer block. Although the term "co-located" is used in this disclosure, similar techniques can be applied with neighboring (e.g., adjacent) blocks of the current block, neighboring (e.g., adjacent) blocks of the co-located block of the current block, or any other related blocks.

Another approach for inter-layer texture prediction may involve the use of an inter-layer reference picture (ILRP). In such example, a reconstructed base layer picture is inserted (after necessary up-sampling) into the reference picture list of the corresponding enhancement layer picture. The inter-layer texture prediction is achieved when the enhancement layer is predicted using the inter-layer reference picture.

Scalability

Scalable video coding schemes may provide various scalabilities, such as spatial scalability and bit-depth scalability. As discussed above, scalable video coding provides one or more scalable enhancement layers that may be decoded in combination with the base layer to achieve higher spatial, temporal, and/or signal-to-noise (SNR) levels.

Spatial scalability refers to the case in which base layer pictures and enhancement layer pictures have different sizes. For example, pictures in the base layer may have the size of 1280 pixels by 720 pixels, whereas pictures in the enhancement layer may have the size of 1920 pixels by 1080 pixels.

Bit-depth scalability refers to the case in which base layer pictures and enhancement layer pictures have different bit-depths. For example, pictures in the base layer may have a bit-depth of 8 bits (e.g., color components are represented with 8 bits, resulting in $2^8=256$ possible values total), whereas pictures in the enhancement layer may have a bit-depth of 10 bits (e.g., color components are represented with 10 bits, resulting in $2^{10}=1024$ possible values total). It is also possible that one color component (e.g., luma) is represented using one bit-depth, and another color component (e.g., chroma) is represented using another bit-depth.

By using SVC to generate a scalable bitstream that contains a base layer that can be decoded by a legacy decoder (e.g., 720p and/or 8-bit) to produce a video content having a lower bit depth (e.g., 720p and/or 8-bit), and one or more enhancement layers that can be decoded by a scalable decoder to produce a more enhanced video content (e.g., 1080p and/or 10-bit), backwards compatibility with legacy decoders may be provided, and the bandwidth requirements compared with simulcasting separate bitstreams may be reduced, thereby improving the coding efficiency and performance.

Spatial Scalability and Inter-Layer Prediction

As discussed above, the pixel values in the base layer may be used to predict the pixel values in the enhancement layer. In the case of spatial scalability, the pictures in the base layer and the pictures in the enhancement layer have different sizes, so the base layer pictures may need to be modified (e.g., such that they are in the same resolution as the enhancement layer pictures) before being used to predict the enhancement layer pictures. For example, the base layer pictures may be upsampled (e.g., if the size of the enhancement layer is greater than that of the base layer) by the resolution ratio between the base layer and the enhancement layer.

An example of such modification in the case of spatial scalability is illustrated below. In this example, an implementation using a 2-tap upsampling filter is used to estimate the color component value $P_{el}$ of an enhancement layer pixel based on the color component values $P_{bl0}$ and $P_{bl1}$ of base layer pixels. Here, the inter-layer prediction may be achieved using weights associated with base layer pixel values (or color component values thereof). One such relationship is expressed in the following equation, where $P'_{el}$ represents the predicted value of $P_{el}$:

$$P'_{el}=(w_0 P_{bl0}+w_1 P_{bl1}+O)>>T \qquad (1)$$

In this example, $w_0$ and $w_1$ represent weights and O represents the offset of the upsampling filter. For example, the weights can be weight factors. In this example, the color component values (e.g., luma component) $P_{bl0}$ and $P_{bl1}$ are multiplied by weights $w_0$ and $w_1$, respectively. In one embodiment, the summation of all the weights (e.g., weights $w_i$) of the upsampling filter is equal to $(1<<T)$, which denotes binary 1 shifted to the left by T bits. The value of T may be chosen or determined based on how much accuracy is desired. In one embodiment, if more accuracy is desired, the value of T may be increased. An increased value of T means more bit-shifting is done to the left, resulting in more bits to perform calculations. In one embodiment, the value of the offset O is $(1<<(T-1))$. In another embodiment, the value of the offset O may be half of the value of the summation of all the weights (e.g., $w_i$). For example, if the value of T is equal to 4, the sum of all the coefficients would be $1<<4$, which is $(10000)_2=16$. In the same example, the offset O would be $1<<3$, which is $(1000)_2=8$. The offset O may be a rounding offset such that the calculations of Equation (1) are rounded up instead of being rounded down. In some embodiments, the offset may be zero.

Bit-Depth Scalability and Inter-Layer Prediction

Similarly, in the case of bit-depth scalability, base layer pixels and enhancement layer pixels are represented in different numbers of bits (e.g., 8 bits vs. 10 bits), so the base layer pixel values may need to be modified (e.g., go through a bit-depth conversion to have the same number of bits as the enhancement layer pixel values) before being used to predict the enhancement layer pixel values. One example of such modification (e.g., bit-depth conversion) involves shifting the bits of the base layer pixels to the left by N (e.g., if the enhancement layer has a higher bit-depth), where N represents the bit-depth difference of the base layer and the enhancement layer.

An example of such modification in the case of bit-depth scalability is illustrated below. In this example, M represents the bit-depth of the enhancement layer, N represents the bit-depth of the base layer, and K represents the bit-depth difference, which is M−N. Here, the bit-depth refers to the bit-depth of a particular color component, such as Y, U, or V in the example of YUV color space. In this example, the luma component is used to illustrate the embodiment, but similar methods can be applied to other color components.

In this example, $P_{el}$ represents the luma component of a pixel in the enhancement layer, and $P_{bl}$ represents the luma component of a corresponding (e.g., co-located) pixel in the base layer. Here, the inter-layer texture prediction may involve converting the base layer color components such that they are represented in the same number of bits as enhancement layer color components. One implementation of such conversion is illustrated in the following equations, where $P'_{el}$ represents the predicted value of $P_{el}$:

$$P'_{el} = P_{bl} << K, \text{ if } K \geq 0 \quad (2)$$

$$P'_{el} = P_{bl} >> (-K), \text{ if } K < 0 \quad (3)$$

For example, if the bit-depth difference between the base layer and the enhancement layer is 2 (e.g., the base layer having a bit-depth of 8 bits and the enhancement layer having a bit-depth of 10 bits), the luma component of the base layer pixel is shifted to the left by 2 bits. Thus, if a pixel (e.g., color white) in the base layer has a luma component of 255 (1111 1111 in binary) in the base layer, according to Equation (1), the predicted value would be 1020 (11 1111 1100 in binary), which is in the vicinity of the luma component of the color white in 10-bit bit-depth, 1023.

In the present disclosure, K is assumed to be greater than or equal to 0 (e.g., the bit-depth of the enhancement layer is greater than or equal to the bit-depth of the base layer). However, similar methods can be applied to the case in which K is less than 0.

Combined Spatial and Bit-Depth Scalability

In one embodiment, if both spatial scalability and bit-depth scalability are present, the above-discussed methods can be combined to achieve both upsampling and bit-depth conversion to predict the enhancement layer pixel values. For example, one implementation may be:

1. Left-shift base layer pixel $P_{bli}$ by K bits: $P'_{bli} = P_{bli} << K$
2. Upsample the left-shifted pixel $P'_{bli}$: $P'_{el} = (w_0 P'_{bl0} + w_1 P'_{bl1} + O) >> T$ In the example shown above, the bit-depth conversion process (e.g., the first process) performs bit-depth conversion on the base layer pixel values and outputs bit-depth-converted pixel values, and the upsampling process (e.g., the second process) performs upsampling on the bit-depth-converted pixel values and outputs upsampled bit-depth-converted pixel values. Thus, the processes performed in series, both upsampling and bit-depth conversion may be achieved.

In another embodiment, the base layer pixel may be first upsampled according to the resolution ratio, and then left-shifted by K bits to obtain the predicted enhancement layer pixel value $P'_{el}$ (e.g., upsampled, bit-depth-converted pixel value).

Single-Stage Process for Spatial and Bit-Depth Scalability

In the example discussed above, the upsampling and the bit-depth conversion are carried out as a two-stage process. In another embodiment, the upsampling and the bit-depth conversion are performed in a single-stage process to generate a prediction for the combined bit-depth and spatial scalability. One implementation of such a single-stage process is illustrated in the equation below.

$$P'_{el} = (w_0 P_{bl0} + w_1 P_{bl1} + O) >> W, \text{ where } W = T - K \quad (4)$$

Equation (4) illustrates an upsampling process, in which the right-shift is reduced by the bit-depth difference K between the base layer and the enhancement layer. Thus, by bit-shifting to the right K bits less than in the case without any bit-depth scalability, the process illustrated in Equation (4) effectively performs bit-shifting to the left by K bits while also accomplishing the upsampling at the same time. In the example of Equation (4), the single-stage process illustrated in Equation (4) is applied to the base layer pixel values, and outputs upsampled, bit-depth-converted pixel values. This is different from the example described above, where the bit-depth conversion process is performed on the base layer pixel values, and the upsampling process is performed on the output of the bit-depth conversion process (e.g., bit-depth-converted base layer pixel values).

In some embodiments, the upsampling and bit-depth conversion are performed simultaneously. In one embodiment, performing the upsampling and bit-depth conversion "simultaneously" may mean that there is at least one operation that contributes to both upsampling and bit-depth conversion. In another embodiment, simultaneously performing both upsampling and bit-depth conversion may mean that a single filter is used to perform both upsampling and bit-depth conversion. In another embodiment, simultaneously performing both upsampling and bit-depth conversion may mean that the upsampling and the bit-depth conversion temporally overlap with each other.

In some embodiments, instead of finishing the upsampling process before performing a separate bit-depth conversion process, the bit-depth conversion process can be integrated into a single-stage upsampling process. Alternatively, in some embodiments, instead of finishing the bit-depth conversion process before performing a separate upsampling process, the upsampling process can be integrated into a single-stage bit-depth conversion process. In one embodiment, the single-stage process may include multiple mathematical operations such as multiplication, addition, and/or bit-shifting. The single-stage process may include at least one operation that contributes to both upsampling and bit-depth conversion. In one example, such operation may be a left bit-shift. In another example, such operation may be a right bit-shift. In yet another example, such operation may involve multiplication. In yet another example, such operation may involve addition.

In one embodiment, after performing the upsampling process, a separate bit-depth conversion process may not need to be performed because the bit-depth conversion has already been performed as part of the upsampling process. For example, the bit-depth conversion process may be integrated into the upsampling process. In one embodiment, one of the operations performed in connection with the upsampling process also accomplishes bit-depth conversion, eliminating the need to perform a separate bit-depth conversion process.

In some embodiments, by performing the upsampling and the bit-depth conversion in a single-stage process, the rounding error in the upsampling process may be reduced. For example, in the single-stage process shown above, the summation of the weighted pixel values $w_0 P_{bl0}$ and $w_1 P_{bl1}$ and the offset O is right-shifted by W, which is less than T in Equation (1), so more digits are preserved, thereby leading to better accuracy.

Figure 8:
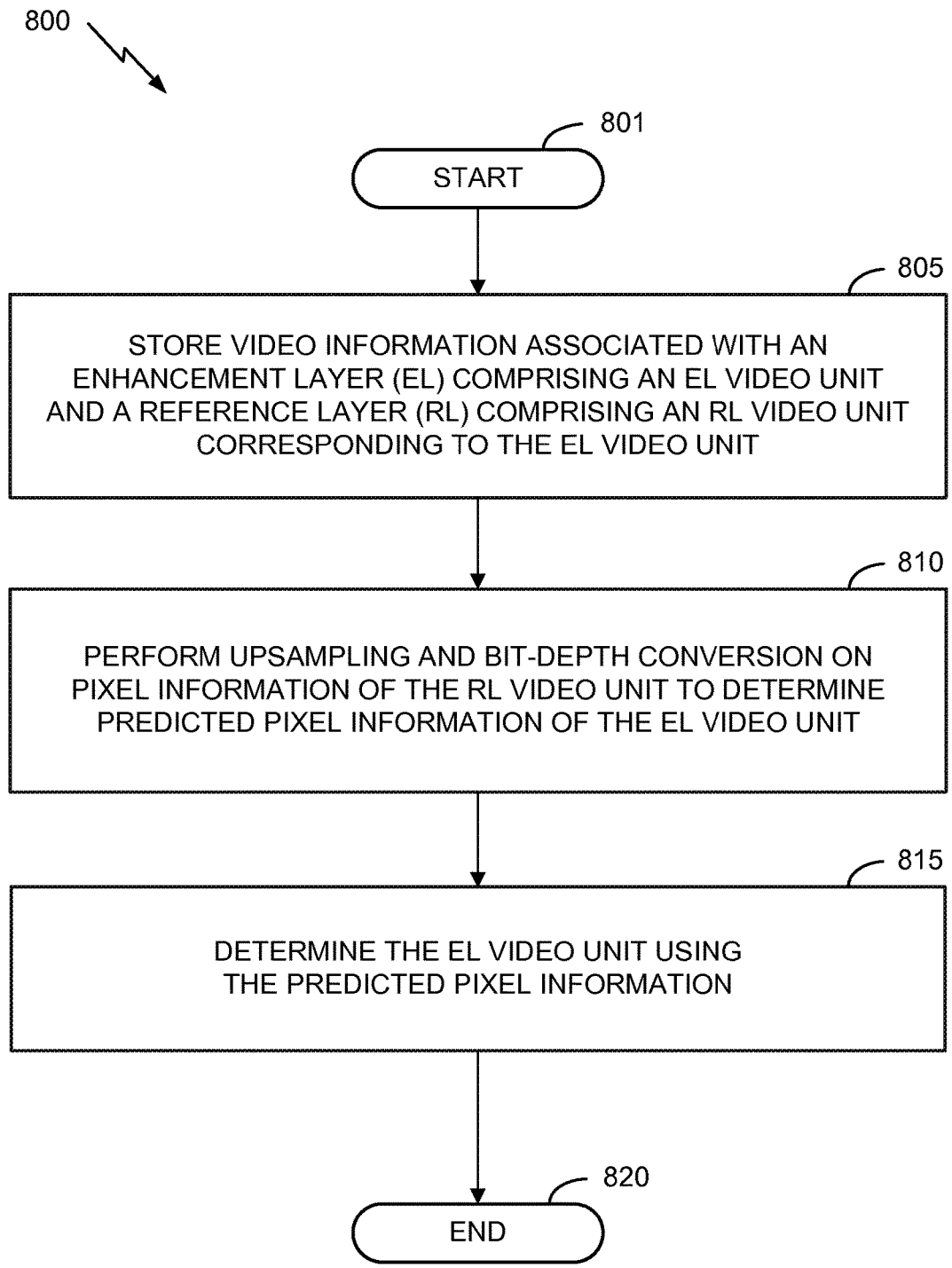
FIG. 8 is a flow chart illustrating a method of coding video information, according to one embodiment of the present disclosure.

FIG. 8 is a flowchart illustrating a method 800 for coding video information, according to an embodiment of the present disclosure. The steps illustrated in FIG. 8 may be performed by an encoder (e.g., the video encoder as shown in FIG. 2B or FIG. 2B), a decoder (e.g., the video decoder as shown in FIG. 3A or FIG. 3B), or any other component. For convenience, method 800 is described as performed by a coder, which may be the encoder, the decoder or another component.

The method 800 begins at block 801. In block 805, the coder stores video information associated with an enhancement layer (EL) comprising an EL video unit and a reference layer (RL) comprising an RL video unit corresponding to the EL video unit. In block 810, the coder performs upsampling and bit-depth conversion on the pixel information of the RL video unit to determine predicted pixel information of the EL video unit. For example, the coder performs both the upsampling and the bit-depth conversion simultaneously by applying a single-stage process. Such single-stage process may include at least one operation that contributes to both upsampling and bit-depth conversion. In one embodiment, pixel information refers to pixel values or color components of such pixel values, and the predicted pixel information refers to the predictor for determining the pixel values or color components of the EL video unit. In one embodiment, the prediction pixel information may be determined by applying a combined upsampling and bit-depth conversion filter configured to upsample and bit-shift pixel values in a single-stage process (e.g., simultaneously). In block 815, the coder determines the EL video unit using the predicted pixel information. For example, such process may involve subtracting the prediction value(s) obtained by applying the prediction function to the RL pixel value(s) from the actual value(s) of the EL block, and transmitting the residual and the prediction. The method 800 ends at block 820.

As discussed above, one or more components of video encoders 20 of FIG. 2A, video encoder 21 of FIG. 2B, video decoder 30 of FIG. 3A, or video decoder 31 of FIG. 3B (e.g., inter-layer prediction unit 128 and/or inter-layer prediction unit 166) may be used to implement any of the techniques discussed in the present disclosure, such as performing upsampling and bit-depth conversion on pixel information, and determining the EL video unit (e.g., the current block in the EL) using the predicted pixel information.

Figure 9:
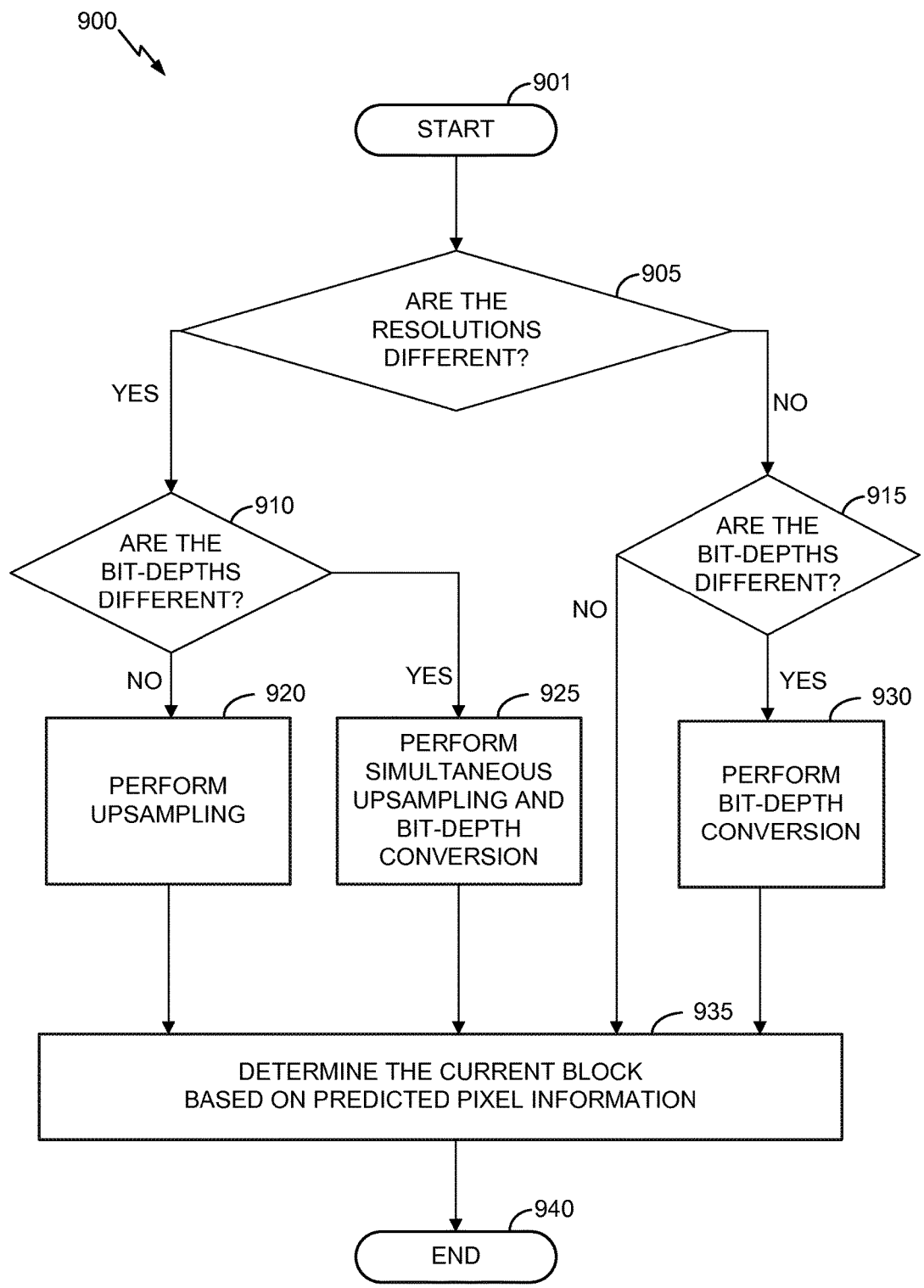
FIG. 9 is a flow chart illustrating a method of coding video information, according to another embodiment of the present disclosure.

FIG. 9 is a flowchart illustrating a method 900 for coding video information, according to an embodiment of the present disclosure. The steps illustrated in FIG. 9 may be performed by an encoder (e.g., the video encoder as shown in FIG. 2A or FIG. 2B), a decoder (e.g., the video decoder as shown in FIG. 3A or FIG. 3B), or any other component. For convenience, method 900 is described as performed by a coder, which may be the encoder, the decoder or another component.

The method 900 begins at block 901. In block 905, the coder determines whether the resolutions of the reference layer and the enhancement layer are different. If the coder determines that the resolutions are different, the coder determines, in block 910, whether the bit-depths of the reference layer and the enhancement layer are different. If the coder determines that the bit-depths are different, the coder performs simultaneous upsampling and bit-depth conversion in block 925 (e.g., on the pixel information of the RL block or RL picture, as discussed with reference to FIG. 8), to determine predicted pixel information of the current block in the enhancement layer. If the coder determines in block 910 that the bit-depths are not different, the coder performs upsampling in block 920 to determine predicted pixel information of the current block. If the coder determines in block 905 that the resolutions are not different, the coder determines, in block 915, whether the bit-depths are different. If the coder determines that the bit-depths are different, the coder performs bit-depth conversion in block 930 to determine the predicted pixel information of the current block. If the coder determines in block 915 that the bit-depths are not different, the coder determines the current block based on the predicted pixel information (e.g., the pixel information of the co-located block in the reference layer) in block 935. Similarly, after the coder determines the predicted pixel information in blocks 920, 925, or 930, the coder determines the current block based on the processed pixel information of the co-located block in the reference layer (e.g., predicted pixel information) in block 935. The method 900 ends at block 940.

As discussed above, one or more components of video encoder 20 of FIG. 2A, video encoder 21 of FIG. 2B, video decoder 30 of FIG. 3A, or video decoder 31 of FIG. 3B (e.g., inter-layer prediction unit 128 and/or inter-layer prediction unit 166) may be used to implement any of the techniques discussed in the present disclosure, such as determining whether the resolutions and/or bit-depths are different, performing upsampling, bit-depth conversion, or simultaneous upsampling and bit-depth conversion, and determining the current block in the EL using the predicted pixel information.

In the method 900, one or more of the blocks shown in FIG. 9 may be removed (e.g., not performed) and/or the order in which the method is performed may be switched. For example, although whether the resolutions are different is checked before checking whether the bit-depths are different in the example of FIG. 9, in another example, whether the bit-depth is different may be checked before checking whether the resolutions are different.

Clipping of Predicted Value

In one embodiment, a clipping process may be applied to the prediction shown in Equation (4) to limit the bit-range of the prediction pixels as shown:

$$P'_{el}=\text{CLIP}(w_0 P_{bl0}+w_1 P_{bl1}+O)\text{>>}W, \text{ where } W=T-K \quad (5)$$

In this example, the value of $P'_{el}$ may be clipped to a value in the range $[0, (1\text{<<}M)-1]$ (e.g., in order to prevent underflow or overflow). For example, if the bit-depth of the EL is 10, the predicted value $P'_{el}$ may be clipped to the range [0, 1023]. The minimum value and the maximum value are not limited to such example and may be predefined or signaled by the encoder. The bit-depth (or the range of values) may be signaled in the PPS.

Two-Dimensional Filters for Spatial and Bit-Depth Scalability

The example discussed with reference to Equation (4) illustrates the case of a one-dimensional (1-D) upsampling filter. In the case that the pictures in the base layer and the enhancement layer comprise 2-D pixel arrays, such a 1-D filter may be used for upsampling the pixels in the vertical direction (e.g., $P_{bl0}$ and $P_{bl1}$ are vertically neighboring pixels in the base layer) or in the horizontal direction (e.g., $P_{bl0}$ an $P_{bl1}$ are horizontally neighboring pixels in the base layer). Using the 1-D upsampling filter, prediction values for pixels in all directions may be generated.

In one embodiment, a two-dimensional separable filter may be used. For example, a 1-D horizontal upsampling filter may be applied, and then, a 1-D vertical upsampling filter may be applied. In another embodiment, the 1-D vertical upsampling filter may be applied before the 1-D horizontal upsampling filter is applied. In the example in which the horizontal upsampling is selected as the first stage and the vertical upsampling is selected as the second stage, the right-shift amount in the second stage (e.g., vertical upsampling) may be reduced to reflect the bit-depth difference between the base layer and the enhancement layer. For example, if $T_{sec}$ represents the right-shift amount in the second stage in the absence of any bit-depth scalability, in the combined upsampling and bit-depth conversion filter (e.g., the 2-D separable filter discussed above), the right-shift amount of $T_{sec}-K$ may be used in the second stage. In other words, the right-shift amount is reduced by the bit-depth difference between the base layer and the enhancement layer such that the need to left-shift the predicted value in a separate stage is eliminated. For example, if $T_{sec}$ is set to 4 and the bit-depth difference is 2, in the second stage, the summation of the weighted color components is shifted to the right by 4−2=2, instead of 4. Although the vertical upsampling is selected as the second stage in this example, the similar technique can be applied when the horizontal upsampling is selected as the second stage. In one embodiment, the bit-shifting in the last stage of the 2-D (or other dimensional) separable filter is reduced by the bit-depth difference of the base layer and the enhancement layer.

In another embodiment, the upsampling may be performed by a 2-D non-separable filter, such as shown below:

$$P'_{ei} = \text{Sum}(w_{ij} * P_{blij}) + O >> T \qquad (6)$$

where $P_{blij}$ is the pixel at location (i, j) and $w_{ij}$ is the corresponding weight for $P_{blij}$. In one embodiment, the sum of all weights $w_{ij}$ is equal to 1<<T. The combination of spatial scalability (with 2-D non-separable upsampling filter) and bit-depth scalability can be implemented using the equation below:

$$P'_{ei} = \text{Sum}(w_{ij} * P_{blij}) + O >> W, \text{ where } W = T - K \qquad (7)$$

As discussed above, by performing the upsampling and the bit-depth conversion in a single-stage process, the rounding error can be reduced, thereby achieving better accuracy.

Adaptive Signaling of Filter Coefficients

In one embodiment of the combined bit-depth and spatial scalability scheme, adaptive inter-layer up-sampling/filtering and/or inter-layer inter-component filtering and/or inter-component filtering can be used. The filter coefficients may be adaptively signaled in the bitstream such as in PPS, APS, slice header, and related extensions. For example, for some frames (or slices), the filter coefficients may be signaled (e.g., transmitted to the decoder), and for some other frames, the filter coefficients may take one or more predefined values. Such predefined values may be known by the encoder and/or the decoder. Thus, the signaling or determination of filter coefficients may differ for different frames (or slices). For example, whether and how to signal the filter coefficients may be determined based on side information, which may include one or more of, but is not limited to, color space, color format (4:2:2, 4:2:0, etc.), frame size, frame type, prediction mode, inter-prediction direction, intra prediction mode, coding unit (CU) size, maximum/minimum coding unit size, quantization parameter (QP), maximum/minimum transform unit (TU) size, maximum transform tree depth reference frame index, temporal layer id, and etc. For example, the filter coefficients may be transmitted only for frames having a size greater than a threshold size. In another embodiment, the filter coefficients may be transmitted only for frames having a size smaller than a threshold size.

In one embodiment, there may be two or more sets of filter coefficients available, and the encoder may signal a choice bit (or bits) that indicates which set of filter coefficients is to be used for the frame. Thus, different frames (or slices) may use different sets of filter coefficients. For example, one frame may include high contrast edges, and filter coefficients that generate a minimal low-pass effect may be used. In the same example, another frame may include a lot of noise, and filter coefficients that generate a stronger low-pass effect may be used. In one embodiment, the encoder predicts the enhancement layer frame with each available set of filter coefficients and selects one set based on coding performance. In one embodiment, plural sets of filter coefficients may be stored somewhere (e.g., a storage) and used by the encoder and/or the decoder. In another embodiment, the filter coefficients may be derived on the fly by the encoder and/or the decoder. In yet another embodiment, the filter coefficients are transmitted by the encoder to the decoder.

In one embodiment, the adaptive inter-layer filter and/or inter-layer inter-component filter and/or inter-component filter discussed above are enabled and/or disabled in the bitstream such as in VPS, SPS, and related extensions. For example, the adaptive filters may be enabled for only a subset of the frames and disabled for other frames.

Offset for Single-Stage Process

In the example discussed with reference to Equation (4), there is no offset added after the bit-shifting is performed. In another embodiment, an offset S is added after the bit-shifting is performed, as illustrated below:

$$P'_{ei} = ((w_0 P_{bl0} + w_1 P_{bl1} + O) >> W) + S \qquad (8)$$

In one embodiment, the offset S can be 1<<(K−1). In this example, the offset O is provided for the upsampling process and the offset S is provided for the bit-depth conversion process (e.g., to get the predicted value to be closer to the actual enhancement layer pixel value).

In another example, an offset can be added before the bit-shifting is performed. In other words, the offset S in Equation (8) can be integrated into the offset O in Equation (8), as illustrated below:

$$P'_{ei} = (w_0 P_{bl0} + w_1 P_{bl1} + O') >> W \qquad (9)$$

where the combined offset O' represents the offset S integrated into the offset O in Equation (8). For example, if the offset O has a value of 1<<(T−1) and the offset S has a value of 1<<(K−1) in the example of Equation (8), the new combined offset O' would be equal to O+(S<<W), which is 1<<T. In this example, since the offset is added in an intermediate stage (e.g., before the bit-shifting is performed), more accuracy is preserved.

In one embodiment, the clipping discussed with reference to Equation (5) is applied to Equation (8) or Equation (9). For example, the value of $P'_{ei}$ may be clipped to a value in the range [0, (1<<M)−1], and any underflow or overflow may be prevented.

Adaptive Selection of Combined Offset

In one embodiment, the combined offset O' discussed above may be adaptively selected (e.g., to improve rate-distortion performance). Such adaptive selection of the combined offset O' may be done, for example, on a coding tree unit (CTU) basis or on a picture-by-picture basis.

For example, in an 8-bit base layer picture, there may be two pixels that represent two different colors: black and white. In the base layer picture, the pixel corresponding to the color black may have a color component value of zero, and the pixel corresponding to the color white may have a color component value of 255. If these two base layer pixels are to be used to predict 10-bit enhancement layer pixels, the pixels may first be shifted to the left by 2 bits, to go from the 8-bit representation to the 10-bit representation. When the bit-depth conversion is performed, the predicted value of the black pixel is still 0 (0<<2), and the predicted value of the white pixel is 1020 (1111 1111<<2, which is 11 1111 1100=1020). After the bit-depth conversion is performed, the predicted value of the black pixel equals the actual value 0, but the predicted value of the white pixel of 1020 is off by 3, as the actual enhancement layer pixel value would 1023. In one embodiment, a fixed offset is added to all predicted values such that the overall prediction error may be reduced. In one example, the offset may be the value at the center of the range. For example, a fixed offset of 2 may be added to all predicted values, which would reduce the prediction error on average. In another embodiment, the offset value is adaptively selected from a plurality of offset values (e.g., 0, 1, 2, 3 in this example) such that the prediction error is minimized for each pixel (or each PU, CU, LCU, or picture, or any other denomination). For example, the offset for the black pixel may be selected to be 0, and the offset for the white pixel may be selected to be 3.

Derivation of Combined Offset from a Look-Up Table

In one embodiment, the combined offset O' may be derived from a look-up table (e.g., range mapping look-up table). Such a look-up table may take base layer pixel values as input, and output offset values for the respective base layer pixel values. Thus, an offset value to be used for predicting an enhancement layer pixel may be based on the color component value (e.g., pixel intensity value) of the corresponding (e.g., co-located) pixel in the base layer. In one embodiment, a look-up table is transmitted by the encoder to the decoder. In another embodiment, a fixed look-up table is known to both the encoder and the decoder. In such a case, the encoder may just signal to the decoder that the encoder is using the look-up table.

Cross-Component Prediction

In some embodiments, different color components (e.g., luma, chroma, etc.) may be processed separately. For example, luma components of base layer pixels may be used to predict chroma components of enhancement layer pixels. In other embodiments, one or more color components may be used to predict other color components. For example, the luma component of a base layer pixel may be used to predict the lower K (bit-depth difference) bits of the chroma components of the corresponding enhancement layer pixel (and vice versa), as illustrated below:

$$P'_{el,Cb}=[(w_0 P_{bl0,Cb}+w_1 P_{bl1,Cb}+O')>>W]+[(w_0 P_{bl0,Y}+w_1 P_{bl1,Y}+O'')>>(T+N-K)] \quad (10)$$

where W equals (T−K). For example, the luma signal may include more detail than the chroma signals. Thus, if base layer chroma components are filtered to predict enhancement layer chroma components, some detail may easily be lost during the process. In the example of Equation (10), luma components are used to predict chroma components. Thus, by doing so, more detail can be preserved.

Information and signals disclosed herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may be implemented in hardware, software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC). Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of inter-operative hardware units, including one or more processors as described above, in conjunction with suitable software and/or firmware.

Various embodiments of the invention have been described. These and other embodiments are within the scope of the following claims.

What is claimed is:

1. An apparatus configured to code video information, the apparatus comprising:
a memory configured to store video data associated with a reference layer (RL) and an enhancement layer (EL), the EL comprising an EL video unit and the RL comprising a RL video unit corresponding to the EL video unit; and
a processor in communication with the memory, the processor configured to:
perform texture upsampling and bit-depth conversion on pixel information of the RL video unit in a single process to determine predicted pixel information of the EL video unit, wherein the single process comprises multiple texture upsampling operations performed to accomplish the texture upsampling, wherein one of the multiple texture upsampling operations also accomplishes the bit-depth conversion, wherein the texture upsampling performed as part of the single process comprises a right-bit-shift operation configured to shift one or more bits to the right by a first amount, whereas the texture upsampling performed without the bit-depth conversion would comprise a right-bit-shift operation configured to shift one or more bits to the right by a second amount, wherein the first amount is less than the second amount by an amount equal to a difference between a bit-depth of the RL and a bit-depth of the EL; and
encode or decode the EL video unit using the predicted pixel information.

2. The apparatus of claim 1, wherein the EL video unit is one of an EL picture and an EL block within the EL picture, and the RL video unit is one of an RL picture and an RL block within the RL picture.

3. The apparatus of claim 1, wherein the bit-depth conversion causes the upsampled RL video unit to have the same number of bits as used for the EL video unit.

4. The apparatus of claim 1, wherein the texture upsampling operation that also accomplishes the bit-depth conversion is the right-bit-shift operation configured to shift one or more bits to the right by the first amount.

5. The apparatus of claim 1, wherein the processor is further configured to apply a combined upsampling and bit-depth conversion filter to the pixel information of the RL video unit, the combined upsampling and bit-depth conversion filter configured to upsample the pixel information of the RL video unit based on a resolution ratio of the RL and the EL and to convert the bit-depth of the upsampled pixel information based on the difference between the bit-depth of the EL and the bit-depth of the RL.

6. The apparatus of claim 1, wherein the processor is further configured to apply a combined bit-depth conversion and upsampling filter to the pixel information of the RL video unit, the combined bit-depth conversion and upsampling filter configured to convert the bit-depth of the pixel information of the RL video unit based on the difference between the bit-depth of the EL and the bit-depth of the RL, and upsample the converted pixel information based on a resolution ratio of the RL and the EL.

7. The apparatus of claim 1, wherein the processor is further configured to apply an upsampling and bit depth conversion filter having one or more weight factors, an offset, and a bit-shift value,
wherein the bit-shift value is dependent on the difference between an EL bit-depth associated with the EL and an RL bit-depth associated with the RL.

8. The apparatus of claim 1, wherein the processor is further configured to apply a two-dimensional separable filter to the pixel information of the RL video unit, the two-dimensional separable filter comprising a horizontal upsampling stage having one or more weight factors, a first offset, and a first bit-shift value, and a vertical upsampling stage having one or more additional weight factors, a second offset, and a second bit-shift value,
wherein the first bit-shift value is dependent on an RL bit-depth associated with the RL, and the second bit-shift value is dependent on an EL bit-depth associated with the EL.

9. The apparatus of claim 1, wherein the processor is further configured to apply a two-dimensional separable filter to the pixel information of the RL video unit, the two-dimensional separable filter comprising a horizontal upsampling stage having one or more weight factors, a first offset, and a first bit-shift value, and a vertical upsampling stage having one or more additional weight factors, a second offset, and a second bit-shift value,
wherein the first bit-shift value is dependent on an RL bit-depth associated with the RL, and the second bit-shift value is determined by a bit-depth difference between the bit-depth of the RL and the bit-depth of the EL.

10. The apparatus of claim 1, wherein the processor is further configured to apply a two-dimensional separable filter to the pixel information of the RL video unit, the two-dimensional separable filter comprising a horizontal upsampling stage having one or more weight factors, a first offset, and a first bit-shift value, and a vertical upsampling stage having one or more additional weight factors, a second offset, and a second bit-shift value,
wherein the first bit-shift value is derived in the same way as a bit-shift value for a case in which an EL bit-depth associated with the EL and an RL bit-depth associated with the RL are identical, and the second bit-shift value is derived based on a bit-depth difference between the EL bit-depth and the RL bit-depth and is less than the bit-shift value for the case in which the EL bit-depth and the RL bit-depth are identical.

11. The apparatus of claim 1, wherein the processor is further configured to apply a two-dimensional non-separable filter to the pixel information of the RL video unit, the two-dimensional non-separable filter comprising a summation of a plurality of pixel values of the RL multiplied by a matrix of weight factors corresponding to the plurality of pixel values.

12. The apparatus of claim 1, wherein the processor is further configured to:
apply a combined upsampling and bit-depth conversion filter having one or more filter coefficients to the pixel information of the RL video unit; and
determine, for each frame in the EL, whether to use said one or more filter coefficients for predicting the EL video unit.

13. The apparatus of claim 1, wherein the RL has a first resolution and a first bit-depth, and the EL has a second resolution different from the first resolution and a second bit-depth different from the first bit-depth, and the texture upsampling and bit-depth conversion converts pixel information having the first resolution and the first bit-depth into pixel information having the second resolution and the second bit-depth.

14. The apparatus of claim 1, wherein the processor is further configured to perform texture upsampling and bit-depth conversion on the pixel information of the RL video unit, and add an offset after the bit-depth conversion is performed.

15. The apparatus of claim 1, wherein the processor is further configured to perform texture upsampling and bit-depth conversion on the pixel information of the RL video unit, and add a single combined offset before the bit-depth conversion is performed.

16. The apparatus of claim 1, wherein the processor is further configured to perform texture upsampling and bit-depth conversion on the pixel information of the RL video unit, and add a single combined offset before the bit-depth conversion is performed, the value of the combined offset being adaptively selected from multiple offset values based on rate-distortion performance.

17. The apparatus of claim 1, wherein the processor is further configured to perform texture upsampling and bit-depth conversion on the pixel information of the RL video unit, and add a single combined offset before the bit-depth conversion is performed, the value of the combined offset being derived from a look-up table configured to output the value of the combined offset based on the pixel information of the RL video unit.

18. The apparatus of claim 1, wherein the processor is further configured to determine chroma components of the predicted pixel information based on both chroma components and luma components of the pixel information of the RL video unit.

19. The apparatus of claim 1, wherein the apparatus comprises an encoder, and wherein the processor is further configured to encode the EL video unit in a bitstream using the predicted pixel information.

20. The apparatus of claim 1, wherein the apparatus comprises a decoder, and wherein the processor is further configured to decode the EL video unit in a bitstream using the predicted pixel information.

21. The apparatus of claim 1, wherein the apparatus comprises a device selected from a group consisting one or more of notebooks, laptops, computers, tablet computers, set-top boxes, telephone handsets, smart phones, smart pads, televisions, cameras, display devices, digital media players, video gaming consoles, and in-car computers.

22. A method of coding video information, the method comprising:
storing video data associated with a reference layer (RL) and an enhancement layer (EL), the EL comprising an EL video unit and the RL comprising an RL video unit corresponding to the EL video unit;
performing texture upsampling and bit-depth conversion on pixel information of the RL video unit in a single process to determine predicted pixel information of the EL video unit, wherein the single process comprises performing multiple texture upsampling operations to accomplish the texture upsampling, wherein one of the multiple texture upsampling operations also accomplishes the bit-depth conversion, wherein the texture upsampling performed as part of the single process comprises performing a right-bit-shift operation that shifts one or more bits to the right by a first amount, whereas the texture upsampling performed without the bit-depth conversion would comprise a right-bit-shift operation configured to shift one or more bits to the right by a second amount, wherein the first amount is less than the second amount by an amount equal to a difference between a bit-depth of the RL and a bit-depth of the EL; and
encoding or decoding the EL video unit using the predicted pixel information.

23. The method of claim 22, wherein the EL video unit is one of an EL picture and an EL block within the EL picture, and the RL video unit is one of an RL picture and an RL block within the RL picture.

24. The method of claim 22, wherein the bit-depth conversion causes the upsampled RL video unit to have the same number of bits as used for the EL video unit.

25. The method of claim 22, wherein the texture upsampling operation that also accomplishes the bit-depth conversion is the right-bit-shift operation configured to shift one or more bits to the right by the first amount.

26. The method of claim 22, further comprising applying a combined upsampling and bit-depth conversion filter to the pixel information of the RL video unit, the combined upsampling and bit-depth conversion filter configured to upsample the pixel information of the RL video unit based on a resolution ratio of the RL and the EL and to convert the bit-depth of the upsampled pixel information based on the difference between the bit-depth of the EL and the bit-depth of the RL.

27. The method of claim 22, further comprising applying a combined bit-depth conversion and upsampling filter to the pixel information of the RL video unit, the combined bit-depth conversion and upsampling filter configured to convert the bit-depth of the pixel information of the RL video unit based on the difference between the bit-depth of the EL and the bit-depth of the RL, and upsample the converted pixel information based on a resolution ratio of the RL and the EL.

28. The method of claim 22, further comprising applying an upsampling and bit depth conversion filter having one or more weight factors, an offset, and a bit-shift value,
wherein the bit-shift value is dependent on the difference between an EL bit-depth associated with the EL and an RL bit-depth associated with the RL.

29. The method of claim 22, further comprising applying a two-dimensional separable filter to the pixel information of the RL video unit, the two-dimensional separable filter comprising a horizontal upsampling stage having one or more weight factors, a first offset, and a first bit-shift value, and a vertical upsampling stage having one or more additional weight factors, a second offset, and a second bit-shift value,
wherein the first bit-shift value is dependent, on an RL bit-depth associated with the RL, and the second bit-shift value is dependent on an EL bit-depth associated with the EL.

30. The method of claim 22, further comprising applying a two-dimensional separable filter to the pixel information of the RL video unit, the two-dimensional separable filter comprising a horizontal upsampling stage having one or more weight factors, a first offset, and a first bit-shift value, and a vertical upsampling stage having one or more additional weight factors, a second offset, and a second bit-shift value,
wherein the first bit-shift value is dependent on an RL bit-depth associated with the RL, and the second bit-shift value is determined by a bit-depth difference between the bit-depth of the RL and the bit-depth of the EL.

31. The method of claim 22, further comprising applying a two-dimensional separable filter to the pixel information of the RL video unit, the two-dimensional separable filter comprising a horizontal upsampling stage having one or more weight factors, a first offset, and a first bit-shift value, and a vertical upsampling stage having one or more additional weight factors, a second offset, and a second bit-shift value,
  wherein the first bit-shift value is derived in the same way as a bit-shift value for a case in which an EL bit-depth associated with the EL and an RL bit-depth associated with the RL are identical, and the second bit-shift value is derived based on a bit-depth difference between the EL bit-depth and the RL bit-depth and is less than the bit-shift value for the case in which the EL bit-depth and the RL bit-depth are identical.

32. The method of claim 22, further comprising applying a two-dimensional non-separable filter to the pixel information of the RL video unit, the two-dimensional non-separable filter comprising a summation of a plurality of pixel values of the RL multiplied by a matrix of weight factors corresponding to the plurality of pixel values.

33. The method of claim 22, further comprising:
  applying a combined upsampling and bit-depth conversion filter having one or more filter coefficients to the pixel information of the RL video unit; and
  determining, for each frame in the EL, whether to use said one or more filter coefficients for predicting the EL video unit.

34. The method of claim 22, wherein the RL has a first resolution and a first bit-depth, and the EL has a second resolution different from the first resolution and a second bit-depth different from the first bit-depth, and the texture upsampling and bit-depth conversion converts pixel information having the first resolution and the first bit-depth into pixel information having the second resolution and the second bit-depth.

35. The method of claim 22, further comprising:
  performing texture upsampling and bit-depth conversion on the pixel information of the RL video unit; and
  adding an offset after the bit-depth conversion is performed.

36. The method of claim 22, further comprising:
  performing texture upsampling and bit-depth conversion on the pixel information of the RL video unit; and
  adding a single combined offset before the bit-depth conversion is performed.

37. The method of claim 22, further comprising:
  performing texture upsampling and bit-depth conversion on the pixel information of the RL video unit; and
  adding a single combined offset before the bit-depth conversion is performed, the value of the combined offset being adaptively selected from multiple offset values based on rate-distortion performance.

38. The method of claim 22, further comprising:
  performing texture upsampling and bit-depth conversion on the pixel information of the RL video unit; and
  adding a single combined offset before the bit-depth conversion is performed, the value of the combined offset being derived from a look-up table configured to output the value of the combined offset based on the pixel information of the RL video unit.

39. The method of claim 22, further comprising determining chroma components of the predicted pixel information based on both chroma components and luma components of the pixel information of the RL video unit.

40. A non-transitory computer readable medium comprising code that, when executed, causes an apparatus to:
  store video data associated with a reference layer (RL) and an enhancement layer (EL), the EL comprising an EL video unit and the RL comprising an RL video unit corresponding to the EL video unit;
  perform texture upsampling and bit-depth conversion on pixel information of the RL video unit in a single process to determine predicted pixel information of the EL video unit, wherein the single process comprises multiple texture upsampling operations performed to accomplish the texture upsampling, wherein one of the multiple texture upsampling operations also accomplishes the bit-depth conversion, wherein the texture upsampling performed as part of the single process comprises a right-bit-shift operation configured to shift one or more bits to the right by a first amount, whereas the texture upsampling performed without the bit-depth conversion would comprise a right-bit-shift operation configured to shift one or more bits to the right by a second amount, wherein the first amount is less than the second amount by an amount equal to a difference between a bit-depth of the RL and a bit-depth of the EL; and
  encode or decode the EL video unit using the predicted pixel information.

41. A video coding device configured to code video information, the video coding device comprising;
  means for storing video data associated with a reference layer (RL) and an enhancement layer (EL), the EL comprising an EL video unit and the RL comprising an RL video unit corresponding to the EL video unit;
  means for performing texture upsampling and bit-depth conversion on pixel information of the RL video unit in a single process to determine predicted pixel information of the EL video unit, wherein the single process comprises multiple texture upsampling operations performed to accomplish the texture upsampling, wherein one of the multiple texture upsampling operations also accomplishes the bit-depth conversion, wherein the texture upsampling performed as part of the single process comprises a right-bit-shift operation configured to shift one or more bits to the right by a first amount, whereas the texture upsampling performed without the bit-depth conversion would comprise a right-bit-shift operation configured to shift one or more bits to the right by a second amount, wherein the first amount is less than the second amount by an amount equal to a difference between a bit-depth of the RL and a bit-depth of the EL; and
  means for encoding or decoding the EL video unit using the predicted pixel information.

* * * * *